United States Patent
He et al.

(10) Patent No.: US 9,130,711 B2
(45) Date of Patent: Sep. 8, 2015

(54) MAPPING SIGNALS FROM A VIRTUAL FREQUENCY BAND TO PHYSICAL FREQUENCY BANDS

(75) Inventors: Yong He, Beijing (CN); Kun Tan, Beijing (CN); Haichen Shen, Beijing (CN); Jiansong Zhang, Beijing (CN); Yongguang Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 889 days.

(21) Appl. No.: 13/294,039

(22) Filed: Nov. 10, 2011

(65) Prior Publication Data

US 2013/0121257 A1    May 16, 2013

(51) Int. Cl.
| | |
|---|---|
| H04L 12/28 | (2006.01) |
| H04L 5/00 | (2006.01) |
| H04L 27/00 | (2006.01) |
| H04L 27/26 | (2006.01) |
| H04J 1/16 | (2006.01) |

(52) U.S. Cl.
CPC ............ H04L 5/0041 (2013.01); H04L 5/0044 (2013.01); H04L 27/0006 (2013.01); H04L 27/2636 (2013.01)

(58) Field of Classification Search
USPC .................................. 370/210, 252, 430, 478
See application file for complete search history.

(56) References Cited

U.S. PATENT DOCUMENTS

| | | | |
|---|---|---|---|
| 5,099,417 A | 3/1992 | Magar et al. | |
| 5,212,777 A | 5/1993 | Gove et al. | |
| 5,784,640 A | 7/1998 | Asghar et al. | |
| 6,114,971 A | 9/2000 | Nysen | |
| 6,167,031 A | 12/2000 | Olofsson et al. | |
| 6,188,702 B1 | 2/2001 | Tornetta et al. | |
| 6,298,035 B1 | 10/2001 | Heiskala | |
| 6,298,370 B1 | 10/2001 | Tang et al. | |
| 6,351,499 B1 | 2/2002 | Paulraj et al. | |

(Continued)

FOREIGN PATENT DOCUMENTS

| | | |
|---|---|---|
| CN | 1973492 | 5/2007 |
| CN | 101399557 | 4/2009 |

(Continued)

OTHER PUBLICATIONS

Alocci et al., "Development of an IEEE 802.11s Simulation Model for QualNet", Dublin, Ireland, retrieved at http://www.csi.ucd.ie/Staff/jmurphy/publications/1551.pdf, Sep. 2008, 9 pages.

(Continued)

*Primary Examiner* — John Pezzlo
(74) *Attorney, Agent, or Firm* — Ladislav Kusnyer; Judy Yee; Micky Minhas

(57) ABSTRACT

Embodiments include processes, systems, and devices for reshaping virtual baseband signals for transmission on non-contiguous and variable portions of a physical baseband, such as a white space frequency band. In the transmission path, a spectrum virtualization layer maps a plurality of frequency components derived from a transmission symbol produced by a physical layer protocol to sub-carriers of the allocated physical frequency band. The spectrum virtualization layer then outputs a time-domain signal derived from the mapped frequency components. In the receive path, a time-domain signal received on the physical baseband is reshaped by the virtual spectrum layer in order to recompose a time-domain symbol in the virtual baseband.

19 Claims, 6 Drawing Sheets

(56) References Cited

U.S. PATENT DOCUMENTS

| | | |
|---|---|---|
| 6,578,153 B1 | 6/2003 | Sankey et al. |
| 6,654,428 B1 | 11/2003 | Bose et al. |
| 6,665,311 B2 | 12/2003 | Kondylis et al. |
| 6,735,448 B1 | 5/2004 | Krishnamurthy et al. |
| 6,785,904 B1 | 8/2004 | Franken et al. |
| 6,788,702 B1 | 9/2004 | Garcia-Luna-Aceves et al. |
| 6,825,827 B2 | 11/2004 | Miura |
| 6,895,512 B1 | 5/2005 | Calbucci |
| 7,016,325 B2 | 3/2006 | Beasley et al. |
| 7,072,818 B1 | 7/2006 | Beardslee et al. |
| 7,162,204 B2 | 1/2007 | Hansen et al. |
| 7,174,145 B2 | 2/2007 | Chatelier et al. |
| 7,230,978 B2 | 6/2007 | Bitterlich et al. |
| 7,287,077 B2 | 10/2007 | Haugh et al. |
| 7,444,168 B2 | 10/2008 | Nakagawa et al. |
| 7,565,140 B2 | 7/2009 | Levy et al. |
| 7,610,017 B2 | 10/2009 | Girardeau, Jr. et al. |
| 7,738,913 B2 | 6/2010 | Hilpisch et al. |
| 7,774,017 B2 | 8/2010 | Irita et al. |
| 7,933,598 B1 | 4/2011 | Agrawal et al. |
| 7,974,176 B2 | 7/2011 | Zheng |
| 8,406,331 B2 | 3/2013 | Orfanos et al. |
| 8,526,412 B2 | 9/2013 | Vijayan et al. |
| 8,526,529 B2 | 9/2013 | Ahn et al. |
| 8,553,521 B2 | 10/2013 | Zhang et al. |
| 2002/0126704 A1 | 9/2002 | Cam et al. |
| 2002/0155811 A1 | 10/2002 | Prismantas et al. |
| 2003/0086366 A1* | 5/2003 | Branlund et al. .............. 370/208 |
| 2004/0068730 A1 | 4/2004 | Miller et al. |
| 2004/0153957 A1 | 8/2004 | Feldman et al. |
| 2004/0156449 A1 | 8/2004 | Bose et al. |
| 2004/0185887 A1 | 9/2004 | Wolman et al. |
| 2004/0252684 A1 | 12/2004 | Evans et al. |
| 2005/0124330 A1 | 6/2005 | Hong et al. |
| 2005/0135308 A1 | 6/2005 | Vijayan et al. |
| 2005/0202858 A1 | 9/2005 | Farber et al. |
| 2006/0109925 A1 | 5/2006 | Kannan et al. |
| 2006/0115012 A1 | 6/2006 | Sadowsky et al. |
| 2006/0145897 A1 | 7/2006 | Kadono et al. |
| 2006/0227856 A1 | 10/2006 | Ledvina et al. |
| 2007/0002898 A1 | 1/2007 | Boariu et al. |
| 2007/0076649 A1 | 4/2007 | Lin et al. |
| 2007/0083786 A1 | 4/2007 | Chiang |
| 2007/0092018 A1 | 4/2007 | Fonseka et al. |
| 2007/0155429 A1 | 7/2007 | Levy et al. |
| 2007/0202816 A1 | 8/2007 | Zheng |
| 2007/0247139 A1 | 10/2007 | Veroni et al. |
| 2008/0043668 A1 | 2/2008 | Chen et al. |
| 2008/0095100 A1 | 4/2008 | Cleveland et al. |
| 2008/0095135 A1 | 4/2008 | Cleveland |
| 2008/0098133 A1 | 4/2008 | Shaanan et al. |
| 2008/0130519 A1 | 6/2008 | Bahl et al. |
| 2008/0165754 A1 | 7/2008 | Hu |
| 2008/0175421 A1 | 7/2008 | Chizari |
| 2008/0178062 A1 | 7/2008 | Norris et al. |
| 2008/0232487 A1 | 9/2008 | Cleveland et al. |
| 2008/0256606 A1 | 10/2008 | Koikara et al. |
| 2008/0261639 A1 | 10/2008 | Sun et al. |
| 2008/0268892 A1 | 10/2008 | Hamdi et al. |
| 2008/0300006 A1 | 12/2008 | Rofougaran et al. |
| 2008/0320529 A1 | 12/2008 | Louchkoff et al. |
| 2009/0034457 A1 | 2/2009 | Bahl et al. |
| 2009/0061783 A1 | 3/2009 | Choi et al. |
| 2009/0063057 A1 | 3/2009 | Miettinen |
| 2009/0089556 A1 | 4/2009 | Lee et al. |
| 2009/0110033 A1 | 4/2009 | Shattil |
| 2009/0175381 A1 | 7/2009 | Bougard |
| 2009/0190537 A1 | 7/2009 | Hwang et al. |
| 2009/0196180 A1 | 8/2009 | Bahl et al. |
| 2009/0197627 A1 | 8/2009 | Kuffner et al. |
| 2009/0204725 A1 | 8/2009 | Liu et al. |
| 2009/0232234 A1 | 9/2009 | Du |
| 2009/0235316 A1 | 9/2009 | Wu et al. |
| 2009/0253376 A1 | 10/2009 | Parssinen et al. |
| 2009/0258603 A1 | 10/2009 | Ghaboosi et al. |
| 2009/0298522 A1 | 12/2009 | Chaudhri et al. |
| 2009/0312028 A1 | 12/2009 | Burchfiel |
| 2009/0323600 A1 | 12/2009 | Chandra et al. |
| 2010/0014603 A1 | 1/2010 | Palanki et al. |
| 2010/0031098 A1 | 2/2010 | Kobayashi |
| 2010/0232369 A1 | 9/2010 | Jing et al. |
| 2010/0246377 A1 | 9/2010 | Zhang et al. |
| 2010/0262420 A1* | 10/2010 | Herre et al. ................... 704/201 |
| 2010/0301992 A1 | 12/2010 | Chandra et al. |
| 2010/0304678 A1 | 12/2010 | Chandra et al. |
| 2011/0116458 A1 | 5/2011 | Hsu et al. |
| 2011/0122855 A1 | 5/2011 | Henry |
| 2011/0123028 A1* | 5/2011 | Karabinis ..................... 380/270 |
| 2011/0134861 A1 | 6/2011 | Seo et al. |
| 2011/0135016 A1 | 6/2011 | Ahn et al. |
| 2011/0188486 A1 | 8/2011 | Kim et al. |
| 2011/0228666 A1 | 9/2011 | Barbieri et al. |
| 2012/0096498 A1 | 4/2012 | Wu et al. |
| 2014/0051467 A1 | 2/2014 | Tan et al. |

FOREIGN PATENT DOCUMENTS

| | | |
|---|---|---|
| CN | 101399930 A | 4/2009 |
| JP | 2007088941 A | 4/2007 |
| JP | 2008503958 A | 2/2008 |
| JP | 2008306665 | 12/2008 |
| JP | 2009515468 | 4/2009 |
| JP | 2009118320 | 5/2009 |
| KR | 20080036534 | 4/2008 |
| KR | 20080098263 | 11/2008 |
| WO | WO9901945 A1 | 1/1999 |
| WO | WO2006000955 | 1/2006 |
| WO | WO2006083495 A2 | 8/2006 |
| WO | WO2007053121 | 5/2007 |
| WO | WO2009018300 A1 | 2/2009 |
| WO | WO2010057302 A1 | 5/2010 |
| WO | WO2010142021 | 12/2010 |
| WO | WO2011015960 | 2/2011 |

OTHER PUBLICATIONS

In the matter of Unlicense Operation in the TV Broadcase Bands, "Order Granting Extension of Time", Federal Communications Commission, released: Dec. 22, 2004, pp. 2.

Borth et al., "Considerations for Successful Cognitive Radio Systems in US TV White Space", Proceedings of the 3rd IEEE Symposium on New Frontiers in Dynamic Spectrum Access Networks, Oct. 14-17, 2008, 5 pages.

Broch et al., "A Performance Comparison of Multi-Hop Wireless Ad Hoc Network Routing Protocols", International Conference on Mobile Computing and Networking, Proceedings of the 4th annual ACM/IEEE international conference on Mobile computing and networking, Oct. 25-30, 1998, pp. 85-97.

Cabric et al., "Experimental Study of Spectrum Sensing Based on Energy Detection and Network Cooperation", Proceedings of the First International Workshop on Technology and Policy for Accessing Spectrum, Aug. 5, 2006, 8 pages.

Chandra et al., "Wireless Networking in the TV Bands", retrieved at http://sdr08.cs.ucdavis.edu/sdr-workshop.ppt, Apr. 1, 2009, 34 pages.

Chu, et al., "A Case for End System Multicast", Proceedings of the 2000 ACM SIGMETRICS International Conference. 28, Issue 1, Jun. 2000, pp. 1-12.

"Cognitive Radio Networks", retrieved at http://www.ece.gatech.edu/research/labs/bwn/CR/Projectdescription.html, Apr. 1, 2009, 13 pages.

Dandawate, et al., "Statistical Tests for Presence of Cyclostationarity", IEEE Transactions on Signal Processing, vol. 42, No. 9, Sep. 1994, pp. 2355-2369.

Deb et al., "Dynamic Spectrum Access in DTV Whitespaces Design Rules, Architecture and Algorithms", ACM 978-1-60558-702-8/09/09, MobiCom '09, Sep. 20-25, 2009, 12 pages.

Web page for Ettus Research LLC, "The USRP Product Family", Mountain View, California, retrieved at http://www.ettus.com, on Mar. 31, 2009, 2 pages.

(56) References Cited

OTHER PUBLICATIONS

Ettus Research LLC, "USRP FAQ", Mountain View, California, retrieved at http://www.ettus.com/faq.html, on Mar. 31, 2009, 7 pages.
"FCC Adopts Rules for Unlicensed Use of Television White Spaces", news release from the Federal Communications Commission, Nov. 4, 2008, retrieved at hraunfoss.fcc.gov/edocs_public/attachmatch/DOC-286566A1.pdf, 2 pages.
FCC Media Bureau, "TVQ TV Database", Retrieved at http://www.fcc.gov/mb/video/tvq.html, Dec. 24, 2009, 2 pages.
"FCC Acts to Expedite DTV Transition and Clarify DTV Build-Out Rules", news release from the Federal Communications Commission, Nov. 8, 2001, 3 pages.
Garroppo et al., "Notes on Implementing a IEEE 802.11s Mesh Point" slide presentation at 4th International Workshop of the EuroNGI/EuroFGI Network of Excellence, Barcelona, Spain, Jan. 16-18, 2008, 39 pages.
Goldsmith, Andrea Jo, "Design and Performance of High-Speed Communication Systems over Time-Varying Radio Channels", EEC S Department, University of CA, Berkeley, Technical Report No. UCB/ERL M94/75, published on Oct. 11, 2012 on 210 pages.
Gurney et al., "Geo-location Database Techniques for Incumbent Protection in the TV White Space", IEEE, 978-1-4244-2017-9/08, Jun. 6, 2008, 9 pages.
"IEEE 802.22 Working Group on WRANs" web page for IEEE 802 LAN/MAN Standards Committee, retrieved at http://www.ieee802.org/22/, retrieved on Mar. 31, 2009, 2 pages.
"IEEE DySpan 2008 Dynamic Spectrum Access Networks", IEEE Symposia on New Frontiers in Dynamic Spectrum Access Networks, Oct. 14-17, 2008, 13 pages.
Jones, et al., "FCC Press Release, Evaluation of the Performance of Prototype TV-Band White Space Devices", Technical Research Branch Laboratory Division Office of Engineering and Technology Federal Communications Commission,, Oct. 15, 2008, pp. 149.
Katabi, Dina, "The Use of IP Anycast for Building Efficient Multicast", Proceedings in Global Telecommunications Conference, Lab. for Computer Science, vol. 3, Dec. 5-9, 1999, pp. 1679-1688.
Kim et al., "Fast Discovery of Spectrum Opportunities in Cognitive Radio Networks", Proceedings of the 3rd IEEE Symposium on New Frontiers in Dynamic Spectrum Access Networks, Oct. 14-17, 2008, 12 pages.
Kim, et al., "In-band Spectrum Sensing in Cognitive Radio Networks: Energy Detection or Feature Detection?", Proceedings of the 14th ACM international conference on Mobile computing and networking, Sep. 14-19, 2008, pp. 14-25.
Kotz, et al., "Analysis of a Campus-wide Wireless Network". In Proceedings of the Eighth Annual International Conference on Mobile Computing and Networking, MOBICOM'02, Sep. 23-26, 2002, pp. 107-118.
Liu, et al., "Sensing-based Opportunistic Channel Access", Mobile Networks and Applications, vol. 11, No. 4, Aug. 2006, pp. 1-28.
"Longley-Rice Methodology for Evaluating TV Coverage and Interference.", Retrieved at http://www.fcc.gov/Bureaus/Engineering_Technology/Documents/bulletins/oet69/oet69 .pdf, Feb. 6, 2004, pp. 15.
Matinmikko, et al., "Cognitive Radio: An intelligent Wireless Communication System", Retrieved at http://www.vtt.fi/inf/julkaisut/muut/2008/CHESS_Research_Report.pdf, Mar. 14, 2008, pp. 155.
Mishra et al., "How much white space is there?", Technical Report No. UCB/EECS-2009-3, Jan. 11, 2009, 16 pages.
Moscibroda et al., "Load-Aware Spectrum Distribution in Wireless LANs", IEEE International Conference on Network Protocols, Oct. 19-22, 2008, pp. 137-146.
Nekovee, Maziar., "Quantifying the TV White Spaces Spectrum Opportunity for Cognitive Radio Access", First International ICST Conference, EuropeComm, Aug. 11-13, 2009, pp. 46-57.
National Geophysical Data Center, "The Global Land One-Km Base Elevation Project (GLOBE),", Retrieved at <<http://www.ngdc.noaa.gov/mgg/topo/globe.html >>, Retrieved Date: Dec. 24, 2009, pp. 2.

NYCwireless Testimony for NY City Council Hearing: The Regulation and Use of the Unallocated Portion of the Radio Spectrum, Also Known as White Spaces, NYC Wireless New Yourk City Council Testimony on White Space, Posted on Sep. 29, 2009, 4 pages.
Office action for U.S. Appl. No. 12/535,415, mailed on Apr. 8, 2013, Tan et al., "Software-Defined Radio Using Multi-Core Processor", 26 pages.
Otsason et al., "Accurate GSM Indoor Localization", UbiComp Sep. 11-14, 2005, LNCS vol. 3660, 2005, pp. 141-158.
PCT International Search Report and Written Opinion for PCT Application No. PCT/US2011/041302, mailed Dec. 28, 2011, 9 pgs.
Plummer Jr., et al., "A Cognitive Spectrum Assignment Protocol Using Distributed Conflict Graph Construction", In Proceedings IEEE MILCOM, Oct. 2007, pp. 1-7.
Radio Magazine, "FCC Adopts Rules for Unlicensed Use of Television White Spaces", Retrieved at http://radiomagonline.com/currents/news/fcc-adopts-rules-unlicensed-white-spaces-1105/ , Nov. 5, 2008, pp. 4.
Ratnasamy et al., "Revisiting IP Multicast", ACM, 1-59593-308-5/06/0009, SigComm '06, Sep. 11-15, 2006, 12 pages.
Rix et al., "Perceptual Evaluation of Speech Quality (PESQ)—A New Method for Speech Quality Assessment of Telephone Networks and Codecs", Proceedings of the 2001 IEEE International Conference Acoustics, Speech and Signal Processing, vol. 2, May 7-11, 2001, 4 pages.
Rosum Corporation, "Reliable, In-Building", Retrieved at http://rosum.com/, Retrieved Date: Dec. 24, 2009, pp. 1.
Sahai et al., Spectrum Sensing Fundamental Limits and Practical Challenges, IEEE Symposium on New Frontiers in Dynamic Spectrum Access Networks, Nov. 8-11, 2005 138 pages.
Web page for Scalable Network Technologies, Inc., Los Angeles, California, retrieved at http://www.scalable-networks.com, retrieved on Mar. 31, 2009, 1 page.
Shellhammer et al., "Technical Challenges for Cognitive Radio in the TV White Space Spectrum", ITA Conference, San Diego, CA, Feb. 8-13, 2009, 11 pages.
Sprectrum Bridge, "Show My White Space", Retrieved at http://showmywhitespace.com/, Retrieved on Dec. 24, 2009, pp. 2.
"Shuttle Radar Topography Mission (SRTM)", Retrieved at http://www2.jpl.nasa.gov/srtm/, Retrieved Date: Dec. 24, 2009, pp. 2.
"Skyhook Wireless", Retrieved at http://skyhookwireless.com/, Retrieved Date: Dec. 24, 2009, pp. 6.
Stirling, "White Spaces—the New Wi-Fi?", International Journal of Digital Television, vol. 1, No. 1, Feb. 2010, pp. 16.
Subramani, et al., "Spectrum Scanning and Reserve Channel Methods for Link Maintenance in Cognitive Radio Systems", Proceedings of the 67th IEEE Vehicular Technology Conference, VTC, May 11-14, 2008, pp. 1944-1948.
Tandra et al., "SNR Wall for Signal Detection", IEEE Journal of Selected Topics in Signal Processing, vol. 2, No. 1, Feb. 2008, pp. 4-17.
Translated Chinese Notice on the First Office Action for CN Application No. 201080024631.7, mailed on Nov. 27, 2013, a counterpart foreign application of U.S. Appl. No. 12/473,951, 12 pgs.
Translated Chinese Notice on the First Office Action for CN Application No. 201080024619.6, mailed on Dec. 10, 2013, a counterpart foreign application of U.S. Appl. No. 12/473,963, 13 pgs.
Translated Chinese Office Action mailed May 22, 2014 for Chinese patent application No. 201080043940.9, a counterpart foreign application of U.S. Appl. No. 12/571,188, 15 pages.
Extended EP Search Report for EP Application No. EP10781356.0, dated Nov. 20, 2013, a counterpart foreign application of U.S. Appl. No. 12/473,963, 6 pgs.
Extended EP Search Report for EP Application No. EP11798778 .4, dated Nov. 25, 2013, a counterpart foreign application of U.S. Appl. No. 12/822,218, 7 pgs.
Intel, "Differential Signaling", Introduction Reading Chapter 6, Dec. 2002, 69 pages.
Translated Japanese Notice of Rejection for Japanese Application No. 2012-513340 mailed on Mar. 26, 2014, a counterpart foreign application of U.S. Appl. No. 12/473,963, 7 pgs.

(56) References Cited

OTHER PUBLICATIONS

Translated Japanese Office Action for Japanese Application No. 2012-513342, mailed on Apr. 30, 2014, a counterpart foreign application of U.S. Appl. No. 12/473,963, 4 pgs.
Office action for U.S. Appl. No. 12/571,188, mailed on May 28, 2014, Tan et al., "Radio Control Board for Software-Defined Radio Platform", 30 pages.
PCT Search Report and Written Opinon for PCT/US2012/064249 mailed Mar. 29, 2013, 10 pages.
Stevenson et al (posted by Peter Murray), "TV Whitespace Petition for Reconsideration Input from 802.22 to 802.18," IEEE P802.22, Jan. 2009, pp. 1-10.
Suzuki et al, "Proposal of Band-Limited Divided-Spectrum Single Carrier Transmission for Dynamic Spectrum Controlled Access in ISM Band," Personal, Indoor and Mobile Radio Communications, 2009 IEEE 20th International Symposium, Sep. 3-16, 2009, pp. 132-136.
Tan, et al., "Sora: High Performance Software Radio Using General Purpose Multi-Core Processors", retrieved on Aug. 13, 2009 at <<http://www.usenix.org/event/nsdi09/tech/slides/tan.pdf>>, NSDI, 2009, pp. 1-27.
Tennenhouse, et al., "SpectrumWare—A Software-Oriented Approach to Wireless Signal Proceesing", retrieved at <<http://citeseerx.ist.psu.edu/viewdoc/download;jsessionid=D99E57C2A2A3CEEF89F66CBA544F774F?doi=10.1.1.17.9618&rep=rep1&type=pdf>>, Telemedia Networks and Systems Group Laboratory for Computer Science, MIT, Nov. 1995, pp. 1-15.
Agarwal et al, "The KILL Rule for Multicore", ACM, DAC 2007, San Diego, California, Jun. 4-8, 2007, pp. 750-753.
"Think Beyond the Box—A Software-Defined Approach to RF Test", National Instruments, retrieved from at <<http://zone.ni.com/devzone/cda/pub/p/id/750>>, May 13, 2009, 4 pgs.
Tsou, et al., "Latency Profiling for SCA Software Radio", retrieved at <<http://www.sdrforum.org/pages/sdr07/Proceedings/Papers/2.2/2.2-1.pdf>>, SDR Forum Technical Conference 2007, Nov. 2007, 6 pgs.
"Using Flexible-LVDS I/O Pins in APEX II Devices", retrieved at <<http://www.altera.com/literature/an/an167.pdf>>, Altera Corporation, Application Note 167, ver 1.1, Aug. 2002, pp. 1-14.
Verdu, "Multiuser Detection", retrieved on Jun. 22, 2009 at <<http://www.cambridge.org/US/catalogue/catalogue.asp?isbn=0521593735>>, Aug. 1998, 2 pages.
Wang et al, "List-Coloring Based Channel Allocation for Open-Spectrum Wireless Networks," IEEE, 2005, pp. 690-694.
"WARP: Wireless Open Access Research Platform", retrieved on Jun. 19, 2009 at <<http://warp.rice.edu/trac>>, Rice University, 2 pgs.
"Waveform Creator has Object-Oriented GUI Optimized for MIMO", Keithley Instruments, Inc., retrieved from <<http://news.thomasnet.com/fullstory/545867>>, Jun. 30, 2008, 8 pgs.
Wu, et al., "A Novel Software Radio Platform Based on General PC and Network", International Conference on Wireless Communications, Networking and Mobile Computing, WiCOM 2006, Sep. 22-24, 2006, pp. 1-4.
Yang et al, "Supporting Demanding Wireless Applications with Frequency-agile Radios," Proceedings of 7th USENIX Symposium on Networked Systems Design and Implementation (NSDI 2010), San Jose, California, Apr. 2010, pp. 1-15.
Zaki et al, "LTE Wireless Virtualization and Spectrum Management," 2010 Third Joint IFIP, Wireless and Mobile Networking Conference (WMNC), Budapest, Oct. 13-15, 2010, 6 pgs.
Aguayo, et al, "Link-level Measurements from an 802.11b Mesh Network," SIGCOMM '04, Portland, Oregon, Aug. 2004, 11 pages.
Bahl, et al, "Cell Breathing in Wireless LANs: Algorithms and Evaluation," IEEE Computer Society, Transactions on Mobile Computing, Feb. 2007 (vol. 6 Issue 2), 16 pages.
Balazinska, et al., "Characterizing Mobility and Network Usage in a Corporate Wireless Local-Area Network," Proceedings of the First Internation Conference on Mobile Systems, Applications and Services; San Francisco, CA, May 2003, 14 pages.
Bejerano, et al, "Fairness and Load Balancing in Wireless LANs Using Association Control," MobiCom'04, Sep. 2004, Philidelpia, Pennsylvania, 15 pages.
Bruno, "High-Speed Wireless LANs: The Impact of Atheros Super G Proprietary Performance Mode on 802.11g Devices," The Tolly Group White Paper, Aug. 2004, 11 pages.
Camp, et al., "Measurement Driven Deployment of a Two-Tier Urban Mesh Access Network," MobiSys 06, Uppsala, Sweden, Jun. 2006, 14 pages.
Delay Spread, JPL's Wireless Communication Reference Website. Last accessed May 1, 2008, 4 pages.
Do-Hyun Na, et al., "Policy Based Dynamic Channel Selection Architecture for Cognitive Radio Networks, Communications and Networking in China," Aug. 2007, pp. 1190-1194.
ElBatt, et al., "Power Management for Throughput Enhancement in Wireless Ad-Hoc Networks," <<http://cs.ucr.edu/~kris/icc1hri.pdf. Last accessed May 1, 2008, 9 pages.
"Building Software Radio Systems: The USRP Product Family," Ettus Research LLC, Mountain View, California, retrieved at <<http://www.ettus.com>>, retrieved on Aug. 8, 2009, 2 pages.
Gast, "802.11 Wireless Networks. The Definitive Guide," Second Edition, Apr. 2002, 436 pages.
Geier, "Enabling Fast Wireless Networks with OFDM." CommsDesign, Feb. 2001, 6 pages.
Ghosh, et al., "A Cognitive Radio Prototype Operating in UHF TV Bands," IEEE Symposia on New Frontiers in Dynamic Spectrum Access, Networks, Demonstrations and Experimentation, IEEE DySPAN 2008, Oct. 2008, retrieved at <<http://cms.comsoc.org/SitGen/Uploads/Public/Docs_DYSPAN_2008/Phillips_Demo_IEEDySPAN2008.pdf>>, 4 pages.
Govil, et al, "Comparing Algorithms for Dynamic Speed-Setting of a Low-Power CPU," TR-95-017, International Computer Science Institute, Apr. 1995, 13 pages.
Gummadi, et al, "Understanding and Mitigating the Impact of RF Interference on 802.11 Networks," SIGCOMM Proceedings of the 2007 Conference on Applications, Technologies, Architectures, and Protocols for Computer Communications; vol. 37, Issue 4, Oct. 2007; 14 pages.
Heusse, et al., "Performance of Anomaly of 802.11b," Proceedings of INFOCOM 2003, Mar. 2003, 8 pages.
Holland, et al, "A Rate-Adaptive MAC Protocol for Multi-Hop Wireless Networks," IEEE International Conference on Mobile Computing and Networking (MOBICOM'01), Rome, Italy, Jul. 2001, 15 pages.
Horowitz, "The Art of Electronics, 2nd Edition," Cambridge University Press, Jul. 28, 1989, 469 pages.
International Search Report for Application No. PCT/US2010/036752 (corresponding to U.S. Appl. No. 12/473,951), mailed on Dec. 31, 2010, 9 pages.
International Search Report for Application No. PCT/US2010/036756 (corresponding to U.S. Appl. No. 12/473,963), mailed on Dec. 29, 2010, 9 pages.
JP Notice of Rejection for Application No. 2012-513340, Mar. 26, 2013, 7 pages.
Judd, et al, "Using Emulation to Understand and Improve Wireless Networks and Applications," NSD0I 2005 Proceedings of the 2nd Conference on Symposium on Networked Systems Design & Implementation—vol. 2, May 2005, 14 pages.
Kamerman, "WaveLan-II: A High-Performance Wireless LAN for the Unlicensed Band." Bell Labs Technical Journal, Aug. 1997. 16 pages.
Lacage, et al., "IEEE 802.11 Rate Adaptation: A Practical Approach," MSWiM '04, Venezia, Italy, Oct. 2004, 9 pages.
Mishra, Mobi-Com Poster Abstract: Client-driven Channel Management for Wireless LANs, Mobile Computing and Communications Review, vol. 10, No. 4, Oct. 2006, pp. 8-10.
Mishra, "Weighted Coloring Based Channel Assignment in WLANs," Mobile Computing and Communications Review, Jul. 2005, 12 pages.
Office action for U.S. Appl. No. 12/571,188, mailed on Jan. 14, 2014, Tan, et al., "Radio Control Board for Software-Defined Radio Platform", 23 pages.

(56) References Cited

OTHER PUBLICATIONS

Office action for U.S. Appl. No. 13/294,093, mailed on Dec. 5, 2013, He, et al., "Mapping a Transmission Stream in a Virtual Baseband to a Physical Baseband with Equalization", 14 pages.
Office Action dated Dec. 10, 2013 in China Patent Application CN201080024619.6, filed May 28, 2010, by Applicant Microsoft Corporation, translated, 13 pages.
Ogilvie, "Clock Solutions for Wi-Fi" (IEEE 802.11), Perocom Semiconductor; www.pericom.com/pdf/applications/AN070.pdf; Sep. 5, 2003, 4 pages.
Proakis, "Digital Communications," McGraw Hill, Aug. 2000, 937 pages.
Rules 70(2) and 70a(2) EPC Communication and Supplemental European Search Report dated Dec. 6, 2013 in EPO Patent Application 10781356.0 (PCT/US2010/036756) filed May 28, 2010, by Applicant Microsoft Corporation, 7 pages.
Shah, et al., "Dynamic Bandwidth Management for Single-hop Ad Hoc Wireless Networks," Mobile Networks and Applications, Mar. 2005, 9 pages.
Shih, et al, "Wake on Wireless: An Event Driven Energy Saving Strategy for Battery operated Devices," MobiCom '02, Proceedings of the 8th annual international conference on Mobile Computing and networking, Sep. 2002, 12 pages.
"SLX Wireless Systems Specifications," SHURE Incorporated, Niles, Illinois, retreived at <<http://www.fullcompass.com/common/files/3227-SLX-Series%20Shure%20specs.pdf>>retreived on Aug. 8, 2009, 3 pages.
Tang, et al, "Analysis of a Local-Area Wireless Network," MobiCom '00; Proceedings of the 6th Annual International Conference on Mobile Computing and Networking, Boston, Massachusetts, Aug. 2000, 10 pages.
Trachewsky, et al, "Broadcom WLAN Chipset for 802.11a/b/g," Broadcom Corporation, CA, USA, Aug. 17, 2003, 42 pages.
"USRP—Frequently Asked Questions," GNU Radio, the GNU Software Radio, retrieved at <<http://gnuradio.org/trac/wiki/UsrpFAQ>>, retrieved on Aug. 8, 2009, 1 page.
Weiser, et al., "Scheduling for Reduced CPU Energy," OSDI '94 Proceedings of the 1st USENIX Conference on Operating Systems Design and Implementation, Nov. 1994, 11 pages.
WiMax Forum. www.wimaxforum.org. Last accessed May 1, 2008, 2 pages.
Wormsbecker, "On Channel Selection Strategies for Multi-Channel MAC Protocols in Wireless Ad Hoc Networks," IEEE International Conference on Wireless and Mobile Computing, Networking and Communications, Jun. 2006, pp. 212-220.
Yuan, et al, "Allocationg Dynamic Time-Spectrum Blocks in Cognitive Radio Networks," 8th ACM International Symposium on Mobile ad hoc networking and computing, Montreal, Quebec, Canada, Sep. 2007, 10 pages.
Office Action for U.S. Appl. No. 12/631,548, mailed on Jan. 10, 2012, Kun Tan, "Analyzing Wireless Technologies Based on Software-Defined Radio", 7 pgs.
Office action for U.S. Appl. No. 12/571,188, mailed on Jun. 6, 2012, Tan et al., "Radio Control Board for Software-Defined Radio Platform", 16 pages.
Office action for U.S. Appl. No. 12/631,548, mailed on Jul. 2, 2012, Tan et al., "Analyzing Wireless Technologies Based on Software-Defined Radio", 7 pages.
Office Action for U.S. Appl. No. 12/535,415, mailed on Apr. 11, 2012, Kun Tan, "Software-Defined Radio Using Multi-Core Processor", 14 pgs.
Office Action for U.S. Appl. No. 12/630,774, mailed on Apr. 12, 2012, Kun Tan, "High Performance Digital Signal Processing in Software Radios", 8 pgs.
System Packet Interface Level 4 (SPI-4) Phase 2 Revision 1: OC-192 System Interface for Physical and Link Layer Devices, Optical Internetworkig Forum, Oct. 15, 2003, 72 pages.
Ma, "A Closter Look at LVDS Technology" Pericom, Apnote 41, Nov. 16, 2001. 3 pages.

"Low-Voltage differential signaling", accessed on Apr. 21, 2011 <http://en.wikipedia.org/wiki/Low-voltage_differential_signaling>, 7 pages.
8b/10b encoding, accessed on Apr. 21, 2011 <http://en.wikipedia.org/wiki/8b/10B>, 9 pages.
Ethernet Frame, accessed on Apr. 21, 2011, <http://en.wikipedia.org/wiki/Ethernet_frame>, 6 pages.
Final Office Action for U.S. Appl. No. 12/473,963, mailed on May 1, 2012, Ranveer Chandra, "Spectrum Assignment for Networks Over White Spaces and Other Portions of the Spectrum", 14 pgs.
Office Action for U.S. Appl. No. 12/473,963, mailed on Nov. 9, 2011, Ranveer Chandra, "Spectrum Assignment for Networks Over White Spaces and Other Portions of the Spectrum", 12 pgs.
PCT International Search Report and Written Opinion for PCT Application No. PCT/US2010/036752 mailed May 13, 2011, 9 pgs.
PCT International Search Report and Written Opinion for PCT Application No. PCT/US2010/036756 mailed May 13, 2011, 9 pgs.
Bhatt, "Creating a PCI Express Interconnect", Intel Corporation, 2002, 8 pages.
Office action for U.S. Appl. No. 12/571,188, mailed on Oct. 25, 2012, Tan et al., "Radio Control Board for Software-Defined Radio Platform", 23 pages.
Office action for U.S. Appl. No. 12/630,774, mailed on Oct. 9, 2012,Tan et al., "High Performance Digital Signal Processing in Software Radios", 5 pages.
Office action for U.S. Appl. No. 12/535,415, mailed on Nov. 21, 2012, Tan et al., "Software-Defined Radio Using Multi-Core Processor", 14 pages.
Texas Instruments, "Texas Instruments, 10-MHz to 66-MHz, 10:1 LVDS Serializer/Deserializer", <http://www.ti.com>, Sep. 2004, 29 pages.
"The ITS Irregular Terrain Model Algorithm, NTIA, Department of Commerce.", Retrieved at http://flattop.its.bldrdoc.gov/itm.html, Retrieved Date: Dec. 24, 2009, pp. 2.
Yuan, et al., "KNOWS: Kognitiv Networking Over White Spaces", IEEE Dynamic Spectrum Access Networks (DySPAN), Apr. 2007, pp. 12.
Web page for "TV Fool", retrieved at http://www.tvfool.com, retrieved on Mar. 31, 2009, 4 pages.
Urkowitz, "Energy Detection of Unknown Deterministic Signals", Proceedings of the IEEE, vol. 55, No. 4, Apr. 1967, pp. 523-531.
Whitt, Richard., "Introducing the White Spaces Database Group", Retrieved at http:// googlepublicpolicy.blogspot.com/2009/02/introducing-white-spaces-database-group.html, Feb. 4, 2009, pp. 4.
Translated Chinese Office Action mailed Jan. 7, 2015 for Chinese patent application No. 201080043940.9, a counterpart foreign application of U.S. Appl. No. 12/571,188, 6 pages.
The Chinese Office Action mailed Dec. 1, 2014 for Chinese patent application No. 201210452650.0, a counterpart foreign application of U.S. Appl. No. 13/294,039, 6 pages.
Translated Japanese Office Action mailed Nov. 25, 2014 for Japanese patent application No. 2014-508666, a counterpart foreign application of U.S. Appl. No. 13/202,297, 7 pages.
Translated Chinese Notice on the Second Office Action for CN Application No. 201080024631.7, mailed on Jul. 11, 2014, a counterpart foreign application of U.S. Appl. No. 12/473,951, 8 pgs.
Translated Chinese Notice on the Second Office Action for CN Application No. 201080024619.6, mailed on Aug. 14, 2014, a counterpart foreign application of U.S. Appl. No. 12/473,963, 7 pgs.
Translated Japanese Notice of Rejection for Japanese Application No. 2013-516700 mailed on Sep. 30, 2014, a counterpart foreign application of U.S. Appl. No. 12/822,218, 4 pgs.
Office action for U.S. Appl. No. 12/571,188, mailed on Jun. 10, 2015, Inventor #1, "Radio Control Board for Software-Defined Radio Platform", 30 pages.
European Office Action mailed Jul. 2, 2015 for European patent application 12846996.2, a counterpart foreign application of U.S. Appl. No. 13/294,039, 5 pages.
The Supplemental European Search Report mailed Jun. 25, 2015 for European Patent Application No. 12846996.2, 3 pages.

* cited by examiner

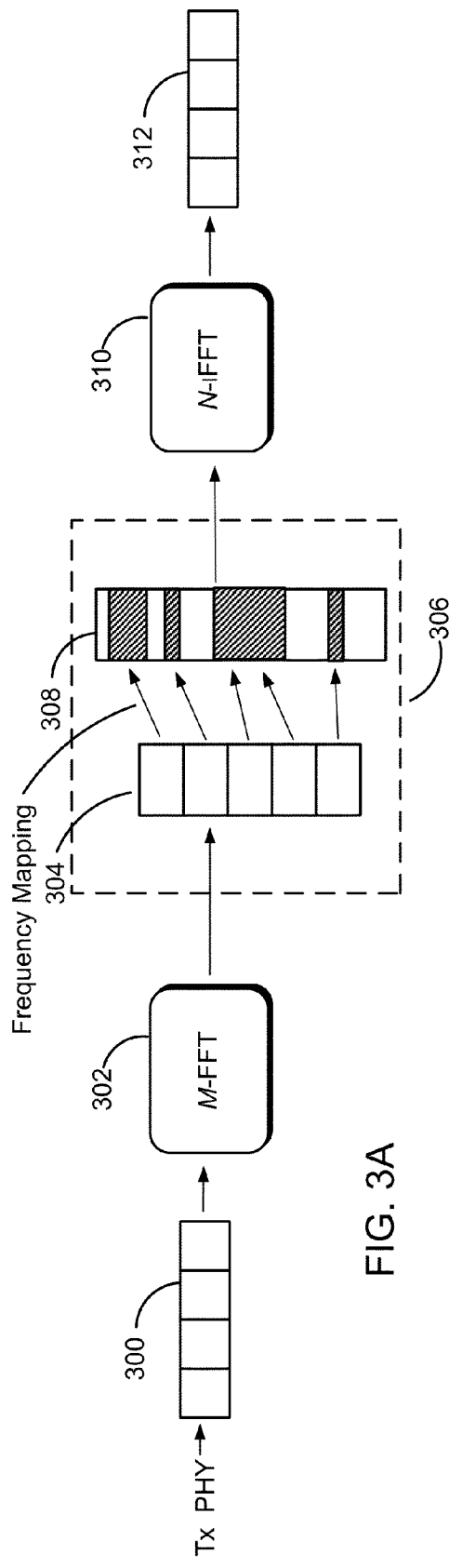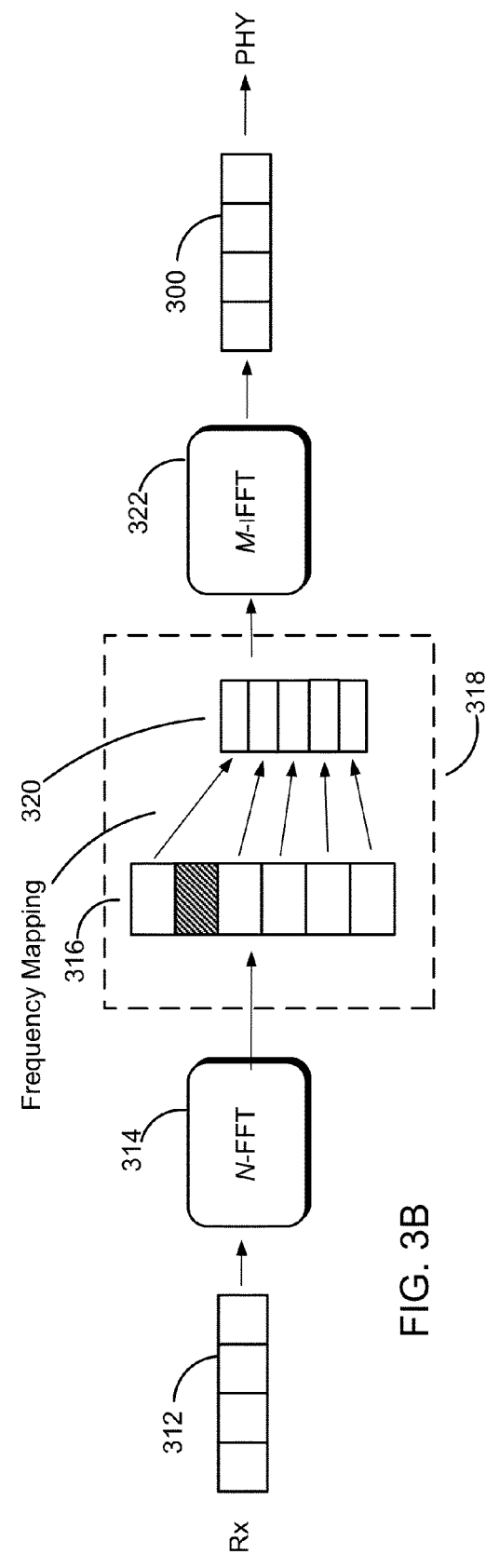

MAPPING SIGNALS FROM A VIRTUAL FREQUENCY BAND TO PHYSICAL FREQUENCY BANDS

RELATED APPLICATIONS

The present application is related to U.S. patent application Ser. No. 13/202,297, filed on Aug. 18, 2011, which is a national stage entry application from PCT Application PCT/CN2011/073647, filed on May 4, 2011.

The present application is related to U.S. patent application Ser. No. 13/294,093, concurrently filed with the present application, and entitled "MAPPING A TRANSMISSION STREAM IN A VIRTUAL BASEBAND TO A PHYSICAL BASEBAND WITH EQUALIZATION."

BACKGROUND

White space frequency bands are frequency bands allocated to television (TV) broadcasting service and to wireless microphone service, but not used in a local geographic area. Recent Federal Communication Commission (FCC) rules allow unlicensed access to white space frequency bands in the United States as long as such access does not interfere with TV and wireless microphone transmission (i.e., "incumbent" or "primary user" access to the frequency bands). Non-U.S. jurisdictions may also in the future implement similar provisions for access to television frequency bands. Available white space frequency bands may have variable bandwidths, and they may be non-contiguous and location-specific. These aspects make white space transmission networks different from conventional wireless transmission networks.

Conventional media access control and physical layer protocols may not support variable and non-contiguous frequency transmission as is typically needed in order to transmit over white space frequency bands. Conventional approaches to adapting a signal to an available spectrum include SampleWidth, SWIFT, and Jello. SampleWidth changes the bandwidth of a signal by adjusting the ticking rate of the baseband clock, which is equivalent to changing the signal's sampling rate. SWIFT and Jello split an orthogonal frequency-divisional signal into non-contiguous spectrum bands.

BRIEF SUMMARY

This Summary is provided in order to introduce simplified concepts of signal mapping and reshaping, which are further described below in the Detailed Description. This summary is not intended to identify essential features of the claimed subject matter, nor is it intended for use in determining the scope of the claimed subject matter.

In embodiments, a wireless device includes a spectrum virtualization layer that reshapes transmission symbols generated for transmission in a virtual baseband into time-domain signals for transmission on one or more non-contiguous and/or variable allocated portions of a physical baseband, such as a white space frequency band. The reshaping process includes a fast Fourier transform of the signal to produce a plurality of frequency components of the transmission symbol, a mapping of the frequency components to sub-carriers of the allocated portions of a physical baseband, and an inverse fast Fourier transform of the mapped frequency components to produce a time-domain signal in the physical frequency band. The spectrum virtualization layer also performs bandwidth adjustment, sampling rate adjustment, and frequency shift operations to allow the reshaped transmission signals to be transmitted by a radio front-end on the physical baseband.

On the receiver side, signals are received by a radio front-end on the physical baseband. A spectrum virtualization layer performs frequency shift, bandwidth adjustment, and sampling rate operations on the received signal. Then, the spectrum virtualization layer reshapes the received signal to produce the symbol in the virtual baseband produced by the PHY layer on the transmitter side. The reshaping includes a fast Fourier transform of the receive signal to produce a plurality of frequency components, a mapping of the frequency components to sub-carriers of the virtual baseband, and an inverse fast Fourier transform of the mapped frequency components to produce the virtual baseband PHY layer symbol in the time domain. Spectrum virtualization layers and the reshapers according to embodiments allow conventional (or non-conventional) physical layer protocols (such as Carrier Division Multiple Access (CDMA) and others) to utilize white space networking without modification to the conventional physical layer protocols. This may speed adoption of white space networking.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 3A illustrates the reshaping of PHY layer time-domain transmission symbols in the virtual baseband into time-domain symbols in the physical baseband.

FIG. 3B illustrates the reshaping of PHY layer time-domain reception symbols in the physical baseband into time-domain symbols in the virtual baseband.

DETAILED DESCRIPTION

Overview

Figure 1:
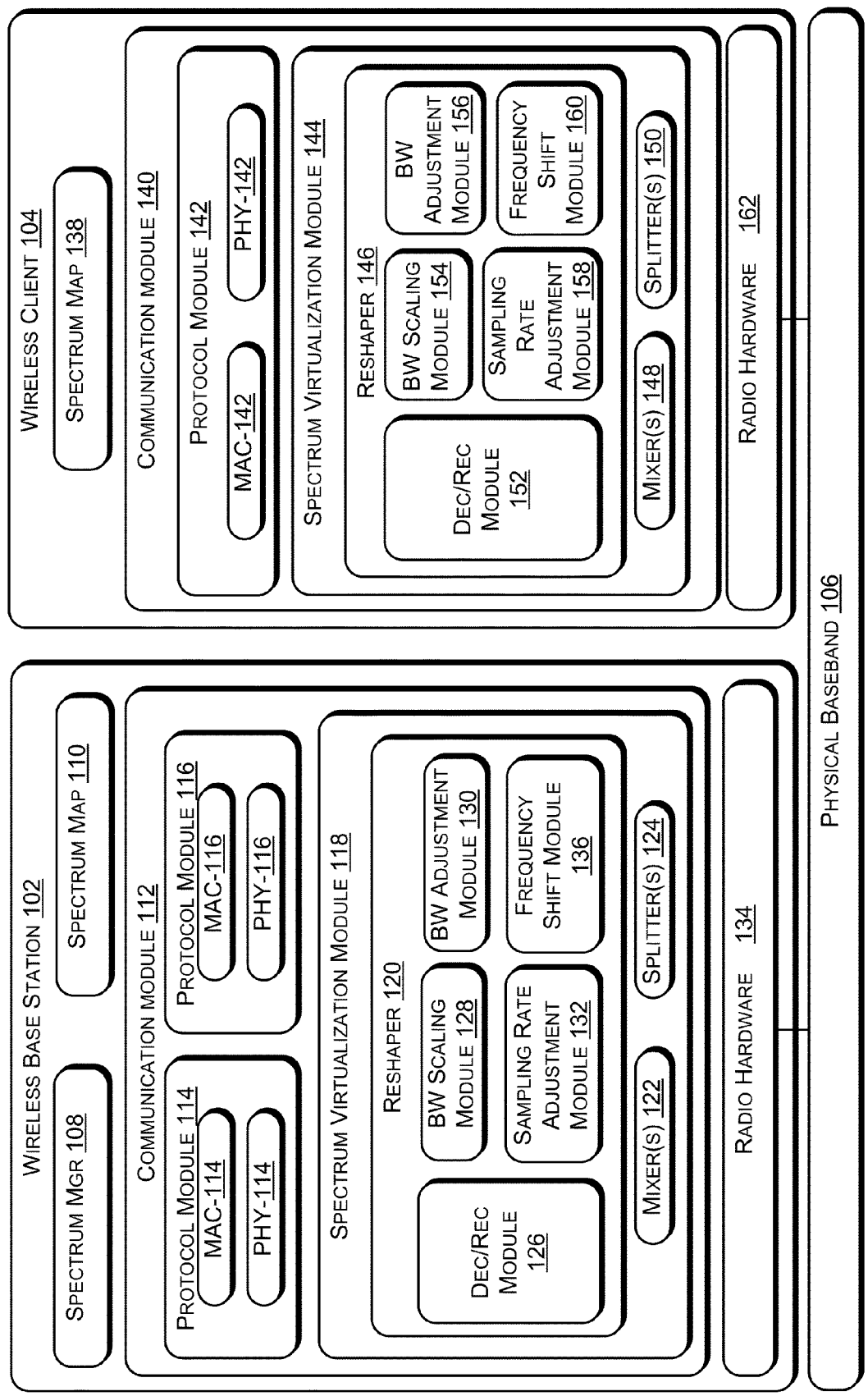
FIG. 1 is a schematic diagram of an example environment usable to reshape and transmit signals from a virtual baseband to a physical frequency band.

As discussed above, white space frequency bands may have variable bandwidths, and they may be non-contiguous and location-specific. A wireless device according to embodiments of the present disclosure utilizes conventional media access control (MAC) and physical layer (PHY) protocols (such as in Wi-Fi®, protocols within the 802.11 suite of protocols, code division multiple access (CDMA) based protocols, carrier sense multiple access (CSMA) based protocols, time division multiple access (TDMA) based protocols, others, and combinations thereof) to communicate over white space frequency bands. The ability to use conventional MAC and PHY protocols may speed the adoption of white space frequency networking, especially if those conventional protocols do not need to be changed by a lengthy standardssetting process. But conventional MAC and PHY protocols may not support variable or non-contiguous frequency transmissions as is required in white space networking, and conventional MAC and PHY protocols may set forth requirements for transmissions on specific frequency bands that differ from the white space frequency bands that happen to be available in a particular geographic area. Embodiments of the present disclosure include devices and methods for enabling conventional MAC and PHY layer protocols to utilize non-contiguous and variable frequency bands.

Embodiments of the present disclosure include a signal reshaper within a spectrum virtualization layer. Conceptually, the spectrum virtualization layer sits beneath the PHY layer (referring to, for example, the Physical (PHY) layer of the seven-layer Open Standards Interface (OSI) model). The spectrum virtualization layer is configured to, among other things, reshape baseband signals that have been generated in accordance with conventional or non-conventional MAC and PHY protocols (i.e., signals that are in a fixed and contiguous baseband or frequency band specified by those protocols") into signals for radio transmission on the variable and/or non-contiguous available physical frequency bands (i.e., signals that are in one or more white space frequency bands). Frequency bands specified by conventional or non-conventional MAC and PHY protocols are hereinafter referred to as a "virtual baseband" or a "virtual frequency band. Reshaping performed by the spectrum virtualization layer is transparent to the MAC and PHY protocols. Transparent reshaping allows signals generated by the MAC and PHY protocols to be transmitted on variable frequency bands without altering the MAC and PHY protocols, thereby potentially speeding adoption of white space networking. Distortion introduced by the reshaping process is handled by existing mechanisms in the MAC and PHY protocols.

A spectrum virtualization module according to embodiments includes a reshaper module. The reshaper module performs signal decomposition/recomposition, bandwidth adjustment, sample rate adjustment, and frequency shifting on transmitted and received signals in order to utilize the available white space frequency bands. Decomposition of a transmitted signal includes transforming a transmission symbol generated by a PHY protocol to generate frequency components of the transmission symbol, mapping the transmission symbol's frequency components to subcarriers within the allocated physical frequency bands (such as white space frequency bands), and inverse transforming the mapped frequency components into a time-domain transmission signal for transmission. The transmission signal is passed to a radio front-end for transmission.

Recomposition of a received signal includes transforming a received signal to produce frequency components of the received signal, mapping the frequency components to sub-carriers of the virtual baseband, and inverse transforming the mapped components into a time-domain symbol in the virtual baseband. The recomposed signal is passed to the upper layer PHY and MAC protocols for further processing according to those protocols.

The spectrum virtualization layer employs bandwidth adjustment if the virtual baseband bandwidth does not equal the aggregate bandwidth of the allocated white space frequency bands. In such cases, the spectrum virtualization layer uses a scaling factor to artificially increase the size of the physical frequency bands so that their aggregate bandwidth is equal to the bandwidth of the virtual baseband. This aspect of bandwidth adjustment is performed in conjunction with the decomposition/recomposition process, and the mapping process maps the frequency components to sub-carriers of the artificially scaled physical frequency bands. Then, after a time-domain signal is produced by the decomposition/recomposition process, the signal bandwidth is reduced by the same factor that was used to artificially increase the size of the physical frequency bands. This reduction includes interpolation, low-pass filtering, and decimation. At the receiver side, the spectrum virtualization layer performs reverse bandwidth scaling and adjustment operations.

Sampling rate adjustment by the spectrum virtualization layer adjusts the sampling rate of the transmit signal to match the sampling rate of the radio front-end used by a wireless device. Similar to the process of bandwidth adjustment, the spectrum virtualization layer uses interpolation and decimation to adjust the sampling rate. At the receiver side, the spectrum virtualization layer performs reverse operations to adjust the sampling rate of the received signal to match the sampling rate of the virtual baseband.

Frequency shifting compensates for an artificial frequency shift that occurs during the mapping portion of the decomposition/recomposition process. During frequency shifting, the spectrum virtualization layer shifts the signal frequencies to match the allocated white space frequency ranges so that the transmission signals can be transmitted on the physical baseband. At the receiver side, the spectrum virtualization layer artificially shifts the signal frequencies back before the received signals are recomposed by the reshaper.

Although various embodiments may be described herein as being related to "white space" transmissions, "white space" networks, "white space" base stations, and "white space" clients, embodiments of the present disclosure are not limited to white space environments. Rather, embodiments include transmissions, networks, base stations, environments, and clients that are usable and/or compatible with any of various Dynamic Spectrum Access (DSA) networks, which include White Space networks. Embodiments refer to "white space" networking for the sake of discussion, and such references should not be taken in a limiting way.

The processes, systems, and devices described herein may be implemented in a number of ways. Example implementations are provided below with reference to the following figures.

Example Environment for Frequency Allocation

FIG. 1 is a schematic diagram of an example environment usable to reshape signals from a virtual baseband to a physical frequency band. The environment 100 may include a wireless base station 102 and a wireless client 104. The wireless base station 102 may be implemented on various suitable computing device types that are capable of implementing a wireless base station. Suitable computing device or devices may include, or be part of, one or more personal computers, servers, server farms, datacenters, special purpose computers, combinations of these, or any other computing device(s) capable of storing and executing all or part of a wireless base station.

In addition, the wireless client 104 may also be implemented on various suitable computing device types that are capable of implementing a wireless client. Suitable computing device or devices may include, or be part of, one or more personal computers, servers, server farms, datacenters, special purpose computers, combinations of these, or any other computing device(s) capable of storing and executing all or part of a wireless client.

The physical baseband 106 is a wireless frequency range or ranges that the wireless client 104 and the wireless base station 102 may use to communicate with one another. These frequency ranges may include, for example, white space frequency ranges. The wireless base station 102 and the wireless client 104 may be coupled to each other through the physical baseband 106 using various communication connections and protocols.

In the illustrative example of FIG. 1, the wireless base station 102 includes a spectrum manager 108. The spectrum manager 108 determines an allocation of white space or other physical frequency ranges of the physical baseband 106 that are available for use in a local geographic area of the wireless base station 102 and the wireless client 104. The spectrum manager 108 may be configured, for example, to communicate with a white space finder service (not shown) and to receive from the white space finder service an allocation of physical frequency ranges of the physical baseband 106 for use in the local geographic area. The spectrum manager 108 contains one or more policies such as regulatory policies or transmission requirements, and the spectrum manager 108 may select from the allocated physical frequency ranges based on these policies. Non-limiting examples of regulatory policies include guard bands requirements, power mask requirements, times that white space frequency bands are available, acceptable transmission power level ranges, and so forth. In another example, the spectrum manager 108 may be configured to determine locally available white space frequencies and to select one or more for transmission according to various policies. See PCT Application PCT/CN2011/073647, filed on May 4, 2011, for examples of a spectrum manger and a white space finder service. The spectrum manager 108 builds and maintains a spectrum map 110, based on the availability of physical frequency bands in the local geographic area. The spectrum map 110 includes a mapping of virtual frequency bands to physical frequency bands.

The wireless base station 102 includes a communication module 112. The communication module 112 includes various protocol modules, such as the protocol modules 114 and 116. The protocol modules 114 and 116 implement the media access control protocols MAC-114 and MAC-116 and the physical layer protocols PHY-114 and PHY-116. The MAC-114 may be different from or the same as the MAC-116, and the PHY-114 may be different from or the same as the PHY-116. The protocol modules 114 and 116 may implement conventional wireless protocols such as in Wi-Fi®, protocols within the 802.11 suite of protocols, code division multiple access (CDMA) based protocols, carrier sense multiple access (CSMA) based protocols, time division multiple access (TDMA) based protocols, others, and combinations thereof. Such conventional wireless protocols may be designed to transmit and receive on specific frequency ranges set forth by those protocols. These specific frequency ranges are referred to herein as virtual frequency ranges, or virtual basebands. Wireless devices according to embodiments may include more or fewer protocol modules than does the wireless base station 102.

The communication module 112 includes a spectrum virtualization module 118. The spectrum virtualization module 118 includes a reshaper 120, mixer(s) 122, and splitter(s) 124. The reshaper 120 includes a decomposition/recomposition module 126 configured to, among other things, map received and transmitted time-domain symbols between the virtual baseband and physical baseband 106 according to spectrum map 110. The decomposition/recomposition module 126 is configured to produce frequency components of the time-domain transmission symbol produced by the protocol modules 114 and 116. The decomposition/recomposition module 126 is configured to accept a transmission symbol from one of the protocol module 114 or the protocol module 116. Such a transmission symbol is produced by the upper layer protocols for transmission on the virtual baseband according to the upper layer protocols. The decomposition/recomposition module 126 is configured to perform an M-point fast Fourier transform (FFT) on the transmission symbol, map or reassign the resulting frequency components to sub-carriers of the allocated physical frequency bands of the physical baseband 106, and perform an N-point inverse fast Fourier transform (iFFT) on the mapped frequency components to produce a time-domain signal for transmission. These processes decompose the time-domain symbols into M frequency-domain components, map the M frequency-domain components to sub-carriers of the allocated portions of the physical baseband 106, and produce N time-domain samples of the mapped M components to produce a time-domain signal for transmission.

Upon receipt of a signal (such as from the wireless client 104 over the physical baseband 106), the decomposition/recomposition module 126 is configured to perform an N-point FFT on the received time-domain signal to produce N frequency components, to map M of the N resulting frequency components that correspond to the allocated physical frequency bands of the physical baseband 106 to sub-carriers of the virtual baseband, and to perform an M-point iFFT on the M mapped components to produce a time-domain symbol in the virtual baseband. These processes recompose the symbol originally produced by the protocol module (such as in wireless client 104). The decomposition/recomposition module 126 is configured to pass the resulting time-domain symbol to the appropriate PHY layer, such as those in the protocol modules 114 and 116. More details on the operation of the components of the decomposition/recomposition module 126 are described elsewhere within this Detailed Description.

The bandwidth scaling module 128 is configured to determine whether the bandwidth of the virtual baseband differs from the aggregate bandwidth of the allocated physical frequency bands of the physical baseband 106. If a difference in the bandwidths is determined, then the bandwidth scaling module 128 artificially scales the allocated physical frequency bands such that their aggregate bandwidth equals the bandwidth of the virtual baseband. In these situations, the decomposition/recomposition module 126 maps the M frequency components to sub-carriers of the scaled allocated physical frequency bands. If the ratio of the aggregate bandwidth of the one or more allocated portions of the physical baseband is 1:1, then no scaling is necessary, and the decomposition/recomposition module 126 maps the M frequency components to sub-carriers of the un-scaled frequency bands. Upon receipt of a receive signal, the bandwidth scaling module 128 performs reverse scaling operations upon a determination that the aggregate bandwidth of the allocated physical frequency bands is not equal to the bandwidth of the virtual baseband. More details regarding the operations of the bandwidth scaling module 128 are described elsewhere within this Detailed Description.

Because the scaled allocated portions of the physical baseband 106 do not match the actual allocated portions of the physical baseband 106, the bandwidth adjustment module 130 is configured to compensate for the bandwidth adjustment performed by the bandwidth scaling module 128 by adjusting the bandwidth of the transmission signal produced by the decomposition/recomposition module 126 to match the actual physical frequency ranges of the physical baseband 106. Thus, the bandwidth adjustment module 130 does not perform bandwidth adjustment unless the aggregate bandwidth of the allocated physical frequency bands of the physical baseband 106 is not equal to the bandwidth of the virtual baseband.

As will be described in more detail elsewhere within this Detailed Description, the bandwidth adjustment module 130 utilizes interpolation, low-pass filtering, and decimation to perform bandwidth adjustment. Upon receiving a signal, the bandwidth adjustment module 130 performs reverse operations to reconstruct the transmission signal produced by the decomposition/recomposition module of the transmitter (such as the wireless client 104, which is described in more detail below).

The sampling rate adjustment module 132 is configured to adjust the sampling rate of the transmission signal produced by the reshaper 120 to match the sampling rate of the radio hardware 134. As will be described in more detail elsewhere within this Detailed Description, the sampling rate adjustment module 132 utilizes interpolation and decimation to re-sample the bandwidth-adjusted time-domain transmission signal. Upon receipt of a signal, the sampling rate adjustment module 132 performs reverse operations to adjust the sampling rate of the received signal to match the sampling rate of the virtual baseband.

The frequency shift module 136 is configured to compensate for a frequency shift that occurs during the mapping operation in the decomposition/recomposition module 126. As will be described in more detail elsewhere within this Detailed Description, the frequency shift module 136 shifts the frequency of the transmission signal by an amount equal to the center frequency of the span of allocated physical bands. Upon receipt of a receive signal from another wireless device, the frequency shift module 136 shifts the frequencies of the receive signal by amount equal to the central frequency spectrum of the span. More details on the operations of the frequency shift module 136 are included elsewhere within this Detailed Description.

The communication module 112 may include multiple reshapers. These reshapers may be configured to accept transmission signals from various ones of the protocol modules 114 and 116, and to map them to physical frequency ranges allocated to those protocol modules according to the spectrum map 110. Where multiple reshapers are utilized, the mixer(s) 122 mix the various reshaped signals from those multiple reshapers prior to passing them to the radio hardware 134. Also, the splitter(s) 124 split and pass multiple reception signals from the incoming signal stream to the appropriate reshapers for signal recomposition during signal reception.

The wireless client 104 includes a spectrum map 138, which mirrors at least a portion of the spectrum map 110 in the wireless base station 102. The wireless base station 102 may communicate with multiple wireless clients on various portions of the physical baseband 106, and spectrum map 138 may only define mapping for those physical frequency bands allocated for transmission to and from the wireless client 104.

The wireless client 104 includes a communication module 140, which includes a protocol module 142. The protocol module 142 includes MAC-142 and PHY-142 protocols. The protocol module 142 may include a conventional or non-conventional protocol stack, configured to transmit on a virtual baseband. The spectrum virtualization module 144 includes a reshaper 146, mixer(s) 148, and splitter(s) 150. The reshaper 146 includes a decomposition/recomposition module 152, a bandwidth scaling module 154, a bandwidth adjustment module 156, a sampling rate adjustment module 158, and a frequency shift module 160. These aspects of the spectrum virtualization module 144 are the same or similar to various aspects of the spectrum virtualization module 118 of the wireless base station 102. The radio hardware 162 is operatively coupled to the mixer(s) 148 and the splitter(s) 150, and is configured to transmit and receive signals via the physical baseband 106.

The spectrum virtualization modules 118 and 144 operate together to allow conventional wireless protocols to communicate over allocated physical bands within the physical baseband 106 without modification to the conventional wireless protocols. The transparent reshaping of wireless signals may spur adoption of white space frequency transmission by enabling conventional (or non-conventional) protocols to utilize white space networking without the need to make changes to those conventional (or non-conventional) protocols, or the need to adopt new wireless protocols that are capable of utilizing non-contiguous and variable frequency bands.

Example Wireless Device

Figure 2:
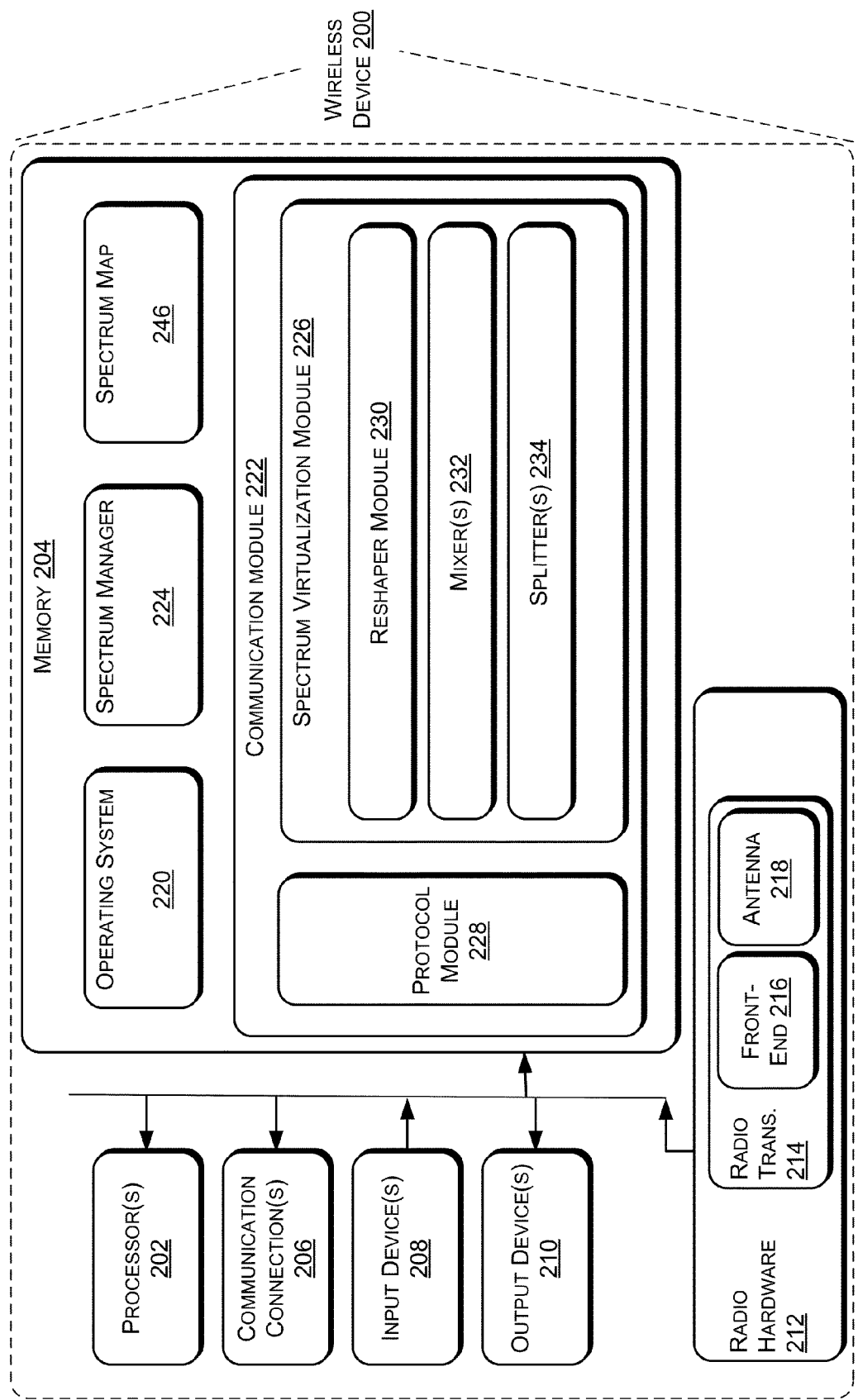
FIG. 2 is a block diagram of an example wireless device having a spectrum virtualization module with a reshaper.

FIG. 2 is a block diagram of an example wireless device including a spectrum virtualization module having a reshaper. The wireless device 200 may be configured as any suitable computing device capable of implementing a wireless device. According to various non-limiting examples, suitable computing devices may include personal computers (PCs), servers, server farms, datacenters, special purpose computers, combinations of these, or any other computing device(s) capable of storing and executing all or part of a wireless device service.

In one example configuration, the wireless device 200 comprises one or more processors 202 and a memory 204. The wireless device 200 may also contain communication connection(s) 206 that allow communications with various devices such as, for example, a white space finder service. The wireless device 200 may also include one or more input devices 208, such as a keyboard, mouse, pen, voice input device, touch input device, etc., and one or more output devices 210, such as a display, speakers, printer, etc. coupled communicatively to the processor(s) 202 and memory 204.

The wireless device 200 includes radio hardware 212. The radio hardware 212 may be implemented as a white-space radio front-end board, or other radio hardware. The radio hardware 212 includes one or more radio transceivers 214, which include radio frequency (RF) front-ends 216 and antenna(e) 218. The radio hardware 212 may be communicatively coupled to the processor(s) 202 and to the memory 204.

The memory 204 may store program instructions, such as software instructions, that are loadable and executable on the processor(s) 202, as well as data generated during execution of, and/or usable in conjunction with, these programs. In the illustrated example, the memory 204 stores an operating system 220, a communication module 222, and a spectrum manager 224. The operating system 220 provides basic system functionality of the wireless device 200 and, among other things, provides for operation of the other programs and modules of the wireless device 200.

The communication module 222 includes a spectrum virtualization module 226 configured to interface with the radio hardware 212 to transmit radio signals to one or more other wireless devices over a physical baseband. The spectrum virtualization module 226 may be the same as one or more of the spectrum virtualization module 118 and the spectrum virtualization module 144 of FIG. 1. The spectrum virtualization module 226 is configured to interface with the wireless transmission protocol module 228. The protocol module 228 may be the same as one or more of protocol modules 114, 116, and 142 of FIG. 1. The spectrum virtualization module 226 is configured to present a virtual baseband to protocol module 228, to reshape outgoing virtual baseband signals to physical baseband signals for transmission on the radio hardware 212, and to reshape incoming physical baseband signals. This allows conventional (or non-conventional) PHY protocols to be used for white space transmission without modification.

The spectrum virtualization module 226 includes a reshaper module 230, which may be the same as one or more of the reshaper 120 and the reshaper 146 of FIG. 1. The spectrum virtualization module 226 also includes mixer(s) 232 and splitter(s) 234.

The spectrum manager 224 may be configured to request and receive information regarding available white space physical transmission frequency bands. The spectrum manager 224 may be the same as the spectrum manager 108 in FIG. 1.

FIG. 3A illustrates the reshaping of PHY layer time-domain transmission symbols in the virtual baseband (i.e., virtual transmission band) into time-domain symbols in the physical baseband. The transmission path Tx begins with the PHY layer generating time-domain symbols 300 in the virtual baseband which are then received by a spectrum virtualization layer. In a reshaper of the spectrum virtualization layer, an M-point FFT 302 is performed on individual ones of the time-domain symbols 300 to produce M frequency components 304 of the time-domain symbols 300. The value M determines the resolution of frequency decomposition. If the PHY layer is a multi-carrier modulated PHY with C sub-carriers in the virtual baseband, then M is set to be equal to or greater than C. If M were less than C, then reshaping operations would potentially introduce inter-carrier interference. If M were very large, on the other hand, then the FFT and iFFT operations of the reshaper would create unnecessary overhead as the computation complex of the FFT operation increases. Therefore, in embodiments, M may be selected according to the following formula:

$$M = \max(C, M_{min})$$

$M_{min}$ specifies a minimal resolution. For example, $M_{min}$ equals 64 in various embodiments.

A mapping module 306 maps the M frequency components 304 to sub-carriers of scaled or unscaled allocated portions of the physical frequency band 308 (the allocated portions are shown shaded in FIG. 3A). An N-point iFFT 310 is performed on the M mapped frequency components to produce a time-domain signal 312 of mixed sub-streams for transmission in the physical frequency band. N is chosen such that the resulting number of N sub-carriers is large enough to cover all of the physical frequency bands. If $b_v$ is the width of the virtual baseband, $b_s$ is the aggregated bandwidth of the allocated portions of the physical frequency band 308, and $b_{span}$ is the width of the span of the physical frequency band 308, then where $b_s = b_v$, N satisfies the equation:

$$N \geq M \frac{b_{span}}{b_v}$$

In various embodiments, N is chosen to be the smallest power of 2 that satisfies this equation. Selecting N this way eases computation.

In order to map the N sub-carriers to allocated portions of the physical frequency band 308, each allocated portion will be shifted by $-f_{span}$, where $f_{span}$ is the central frequency of the span $B_{span}$ of the physical frequency band 308. Thus, each physical band $B_{p,i}(f_i, b_i) \in \Theta$, is shifted by $(-f_{span})$ to be $\hat{B}_{p,i}(f_i - f_{span}, b_i)$. A sub-carrier is available if it is covered by any $\hat{B}_{p,i}$. An available sub-carrier can be mapped to a frequency component of a baseband signal. There are at least M available sub-carriers in the allocated portions of the physical frequency band 308.

In various embodiments, the number of samples K in a PHY symbol may be different from M. For a single-carrier PHY, K is usually smaller than M. In a multi-carrier PHY, K is usually greater than M due to the use of a cyclic-prefix in the PHY layer. Performing a decomposition of the time-domain symbol, including the M-point FFT and an N-point iFFT, enlarges the signal bandwidth by a factor of $$\beta = \frac{N}{M}.$$

At the same time, the decomposition converts K samples of a symbol to βK samples.

If K is less than or equal to M, then the reshaper pads zeros to the K sample before performing M-point FFT. According to digital signal processing theory, zero padding in the time-domain does not change the frequency response of a signal. After the mapping and N-point iFFT operations, the first βK samples are output and the reshaper truncates the remaining samples. The remaining samples are truncated because they are not significant.

If K is greater than M, then the reshaper performs M-point FFT for every M samples. The number of remaining samples is L=K−M. An additional M-point FFT (not shown) is performed on the (K−M)th sample to the Kth sample. This artificial shift in the FFT window by (M−L) samples causes a phase rotation in the frequency domain. The reshaper compensates for this prior to performing the N-point iFFT 310. Compensation is performed by rotations of the phase of values on corresponding sub-carriers. For example, if a frequency component i has been assigned to sub-carrier j, the sample at sub-carrier j is multiplied by a factor of $$e^{j2\pi \frac{M-L}{M}(j-i)}.$$

After performing the N-point iFFT 310, the last group of samples will overlap with its previous group by β(M−L) samples. An average for the β(M−L) samples is taken as output.

FIG. 3B illustrates the reshaping of PHY layer time-domain reception symbols in the physical baseband into time-domain symbols in the virtual baseband (i.e., virtual reception band). The reception path Rx begins with the spectrum virtualization layer receiving time-domain signal 312 of the receive signal in a mixed sub-stream. An N-point FFT 314 is performed on the time-domain signal 312 to produce N frequency components 316 of the receive signal. A mapping module 318 maps M of the N frequency components from sub-carriers in allocated portions of the physical frequency band 308 to sub-carriers in the virtual spectrum band 320. Thus, some of the N frequency components (such as the shaded frequency component in FIG. 3B) may not be mapped to the virtual spectrum band 320; these unmapped frequency components correspond to signals from the unallocated portions of the physical frequency band 308. An M-point iFFT 322 is performed on the M mapped frequency components in the virtual baseband to recompose time-domain symbols 300 in the virtual baseband, which are then passed by the spectrum virtualization layer to the PHY layer protocol.

In the case where the number of samples K in the virtual baseband time-domain symbol is greater than M, the reshaper will reduce the signal bandwidth by β. Accordingly, in the receive path Rx the reshaper takes K samples from the physical bands and regenerates $$\frac{K}{\beta}$$

virtual baseband samples.

As noted elsewhere within this Detailed Description, the reshaper scales the physical frequency bands whenever $b_s$ (the aggregated bandwidth of the physical frequency bands) is less than $b_v$ (the virtual bandwidth). The transmitting reshaper scales the physical frequency bandwidths by a factor of $a=b_v/b_s$. Thus, the aggregated bandwidth of the scaled physical frequency bands $b_s$ is equal to $b_v$. Whenever scaling is performed, the decomposition/recomposition operations described above are performed using these scaled bandwidths. As is described elsewhere within this Detailed Description, bandwidth adjustment will compensate for this scaling prior to transmission.

Figure 4:
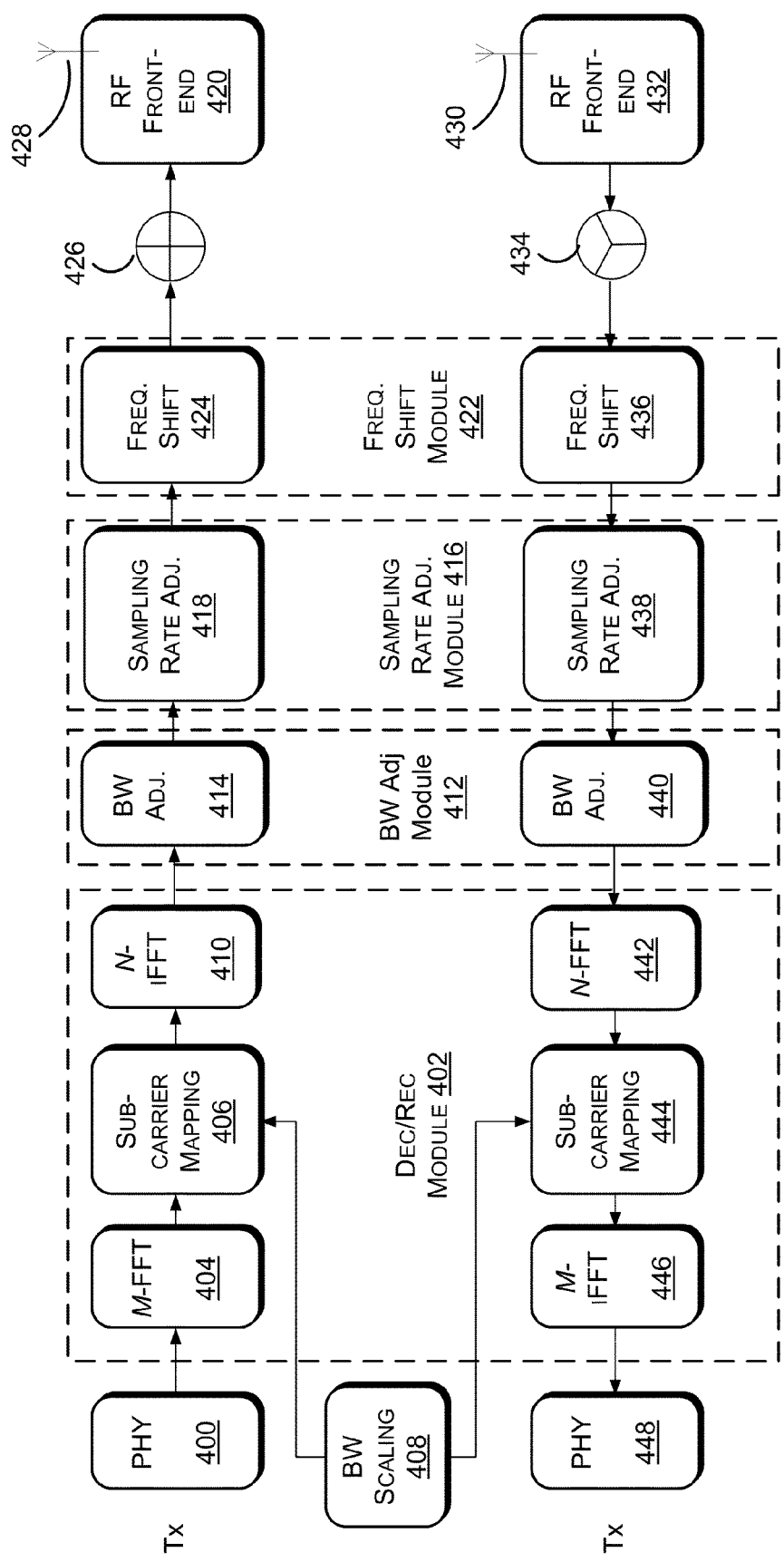
FIG. 4 illustrates transmission and reception paths within a spectrum virtualization layer in accordance with embodiments.

FIG. 4 illustrates transmission and reception paths within a spectrum virtualization layer in accordance with embodiments. In the transmission path Tx, the PHY layer 400 passes transmission symbols to a decomposition/recomposition module 402. An M-point FFT 404 is performed on the transmission symbols to generate M frequency components. A sub-carrier mapping 406 is performed to map the M frequency components to sub-carriers of scaled or unscaled allocated portions of the physical frequency band. In certain instances, such as where $b_s$ (the aggregated bandwidth of the physical frequency bands) is less than $b_v$ (the virtual bandwidth), a bandwidth scaling 408 scales the allocated portions of the physical frequency band by a factor of $a=b_v/b_s$. Once the frequency components have been mapped, an N-point iFFT 410 is performed on the mapped frequency components to produce time domain transmission signals in the (scaled or unscaled) physical frequency bands.

A bandwidth adjustment module 412 receives the transmission signals from the decomposition/recomposition module 402 and performs a bandwidth adjustment 414 to compensate for bandwidth scaling performed by the bandwidth scaling 408. Where the bandwidth scaling 408 scales the physical frequency bands by a factor α, the bandwidth adjustment 414 reduces the bandwidth of the signal by α. To reduce the bandwidth of the signal, zero pad samples are added to the signal. In particular, a times more samples are added to the signal to reduce the bandwidth by α. This is achieved by interpolation and decimation. In particular, where α=k/l, and where k and l are integers, the following steps are taken:

1. Zero padding is performed. For each sample, k−1 zeros are padded.
2. Low-pass filtering is performed. A low-pass filter is applied to the zero-padded samples to remove the high-frequency signal image.
3. Decimation is performed. Every lth sample is picked up to obtain the final signal.

A sampling rate adjustment module 416 receives the bandwidth-adjusted transmission signals and performs a sampling rate adjustment 418 to adjust the sampling rate of the bandwidth-adjusted time-domain transmission symbols to match the sampling rate of the RF front-end 420. The sampling rate adjustment 418 re-samples the transmission symbol using the real sampling rate of the RF front-end 420. The sampling rate adjustment 418 includes interpolation and decimation. For example, where $f_s$ is the sampling rate after the bandwidth adjustment 414, $f_r$ is the real sampling rate of the RF front-end 420, and $f_{LCM}$ is the least common multiple of both $f_s$ and $f_r$, interpolation is accomplished by padding the signal by $m=(f_{LCM}/f_s-1)$ zero samples, and by passing the signal through a low-pass filter to remove imaging. Then, the padded signal is decimated by $n=f_{LCM}/f_r$ to get the final signal with a desired sampling rate of $f_r$. Because the bandwidth adjustment 414 and the sampling rate adjustment 418 utilize the same digital signal processing operations of interpolation and decimation, they are combined in embodiments to save computation.

The frequency shift module 422 receives the sampling rate-adjusted, bandwidth-adjusted time-domain transmission signals and performs a frequency shift 424 to compensate for the frequency shift caused by sub-carrier mapping 406. The signal generated by the N-point iFFT 410 is centered at zero. Thus, the sub-carrier mapping 406 shifts the physical bands artificially by $-f_{span}$, where $f_{span}$ is the central frequency of the span $B_{span}$ of the allocated physical bands. The frequency shift 424 compensates for this in order to allow the signals to be transmitted on the actual allocated portions of the physical baseband. The frequency shifting includes multiplying a digital sample $\{x_i\}$ by a factor of $e^{j2\alpha f_h i}$, where j is the imaginary unit, $f_h$ is the amount of frequency (in Hz) to be shifted, and i is the index of samples.

The sampling rate-adjusted, bandwidth-adjusted, frequency-shifted time-domain transmission signals are mixed by the mixer 426 with other transmission signals from other reshapers (not shown) of the spectrum virtualization layer, as needed (e.g., where other reshapers are utilized to reshape transmission symbols from other PHY layers besides the PHY layer 400). The RF front-end 420 receives the mixed transmission signals and transmits them on the physical baseband via the antenna 428.

In the receive path Rx, a receive signal is picked up by the antenna 430 (which may be the same antenna as the antenna 428) on the physical baseband and is passed to the RF front-end 432 (which may be the same RF front-end as the RF front-end 420). The receive signal is passed to the splitter 434 which splits multiple receive signals and passes them to various reshapers. One of the split signals is passed to the frequency shift module 422 which performs a frequency shift 436. The frequency shift 436 is the reverse of the shift operation that occurs in frequency shift 424. The signal is shifted by $-f_{span}$.

The sampling rate adjustment module 416 receives the frequency-shifted signal and performs a sampling rate adjustment 438 to adjust the sampling rate of the signal to be equal to the sampling rate of the virtual baseband. The inverse of the operations performed by the sampling rate adjustment 418 are performed here. The sampling-rate adjusted signal is passed to the bandwidth adjustment module 412, which performs a bandwidth adjustment 440 to adjust the bandwidth in order to compensate for the fact that the bandwidth scaling 408 will artificially scale the physical frequency bands during the recomposition process. The inverse of the operations performed by the sampling rate adjustment 414 are performed here. The bandwidth adjustment 440 occurs only where $b_s$ (the aggregated bandwidth of the physical frequency bands) is less than $b_v$ (the virtual bandwidth).

The decomposition/recomposition module 402 receives the frequency-shifted, sampling rate-adjusted, bandwidth-adjusted signal and performs N-point FFT 442 to produce N frequency domain components. A subcarrier mapping 444 maps M of the N frequency components that correspond to (scaled or unscaled) allocated portions of the physical baseband to subcarriers of the virtual baseband. The mapped M frequency components are passed to an M-point iFFT 446 to produce time-domain symbols in the virtual baseband. The virtual baseband time-domain symbols are then passed to the PHY 448, which may be the same as the PHY layer 400.

Example Reshaping Process During Transmission

Figure 5:
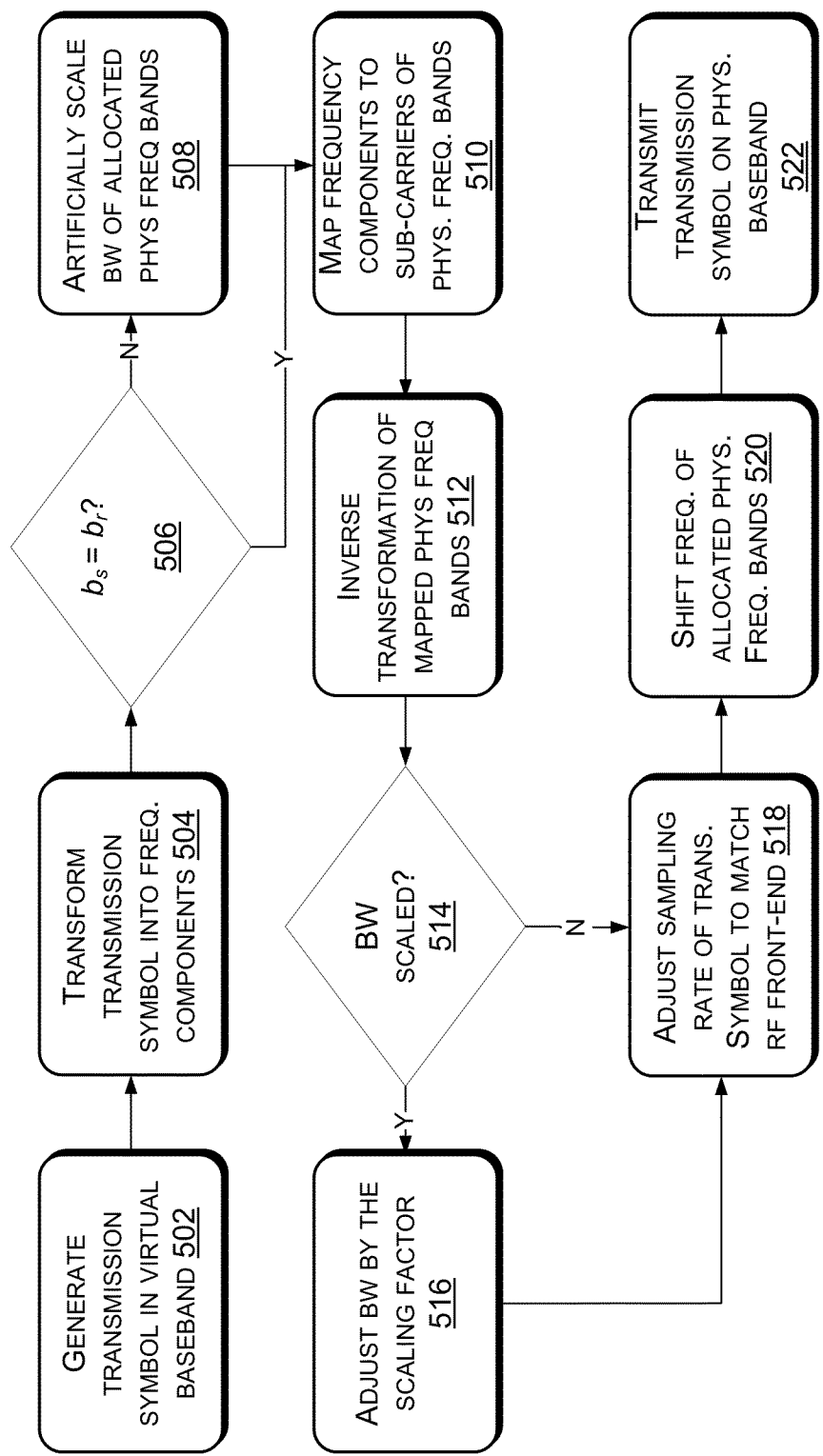
FIG. 5 is a flow diagram showing an example process of reshaping during transmission.

FIG. 5 is a flow diagram showing an example process 500 of reshaping during transmission. A PHY layer generates a transmission symbol in a virtual baseband, block 502. In embodiments, such as where the PHY layer is part of a conventional wireless protocol, the virtual frequency band may be contiguous and non-variable.

A spectrum virtualization layer receives the transmission symbol and performs a transformation of the symbol to derive a plurality of frequency components, block 504. The transformation may be an M-point FFT that produces M frequency components. M is the resolution of the FFT process, and is the greater of either a predetermined value—such as 64—or the number of sub-carriers of the virtual frequency band.

Where $b_s$ (the aggregated bandwidth of the physical frequency bands) is less than $b_v$ (the virtual bandwidth), block 506, the spectrum virtualization layer artificially scales the bandwidth of the allocated physical frequency bands, block 508. The spectrum virtualization layer scales the one or more allocated physical frequency bands by a factor α determined at least in part by a ratio of an aggregate bandwidth of the one or more allocated physical frequency bands and a virtual bandwidth of the virtual frequency band.

The spectrum virtualization layer maps the frequency components of the transmission symbol to sub-carriers of the scaled or un-scaled ones of the one or more allocated physical frequency bands, block 510. The mapping process includes a frequency shift of the one or more allocated physical frequency bands by an amount equal to $-f_{span}$, where $f_{span}$ is the central frequency of the span $B_{span}$ of the allocated physical bands.

The spectrum virtualization layer performs an inverse transformation on the plurality of frequency components to generate a time-domain signal for transmission, block 512. In embodiments, the spectrum virtualization layer performs an N-point iFFT on the mapped M frequency components. As noted elsewhere within this Detailed Description, N is at least as large as M multiplied by a ratio that is a function of the virtual bandwidth and the associated aggregate physical bandwidth.

If the physical frequency bands have been scaled by a factor α to account for the fact that $b_s$ (the aggregated bandwidth of the physical frequency bands) is less than $b_v$ (the virtual bandwidth), block 514, then the spectrum virtualization layer adjusts the bandwidth of the time-domain signal by the same factor α, block 516. This adjustment includes the digital signal processing steps of interpolation (zero padding of the signal samples), low-pass filtering, and decimation.

The spectrum virtualization layer adjusts the sampling rate of the transmission signal to match the sampling rate of the radio front-end, block 518. The sampling rate adjustment includes interpolation and decimation. Because bandwidth adjustment and sampling rate adjustment use similar digital signal processing operations, embodiments may combine the two processes to decrease computational overhead.

The spectrum virtualization layer shifts the frequencies of the sampling rate-adjusted signal to compensate for a frequency shift that occurs during the mapping process, block 520. Shifting the frequency includes multiplying digital samples of the signal $\{x_i\}$ by a factor of $e^{j2\pi f_h i}$.

The radio front-end transmits the transmission signal on the physical baseband, block 522. Thus, a PHY layer transmission symbol, generated on a contiguous, fixed virtual baseband is transmitted on non-contiguous and variable allocated portions of the physical baseband.

Example Reshaping Process During Reception

Figure 6:
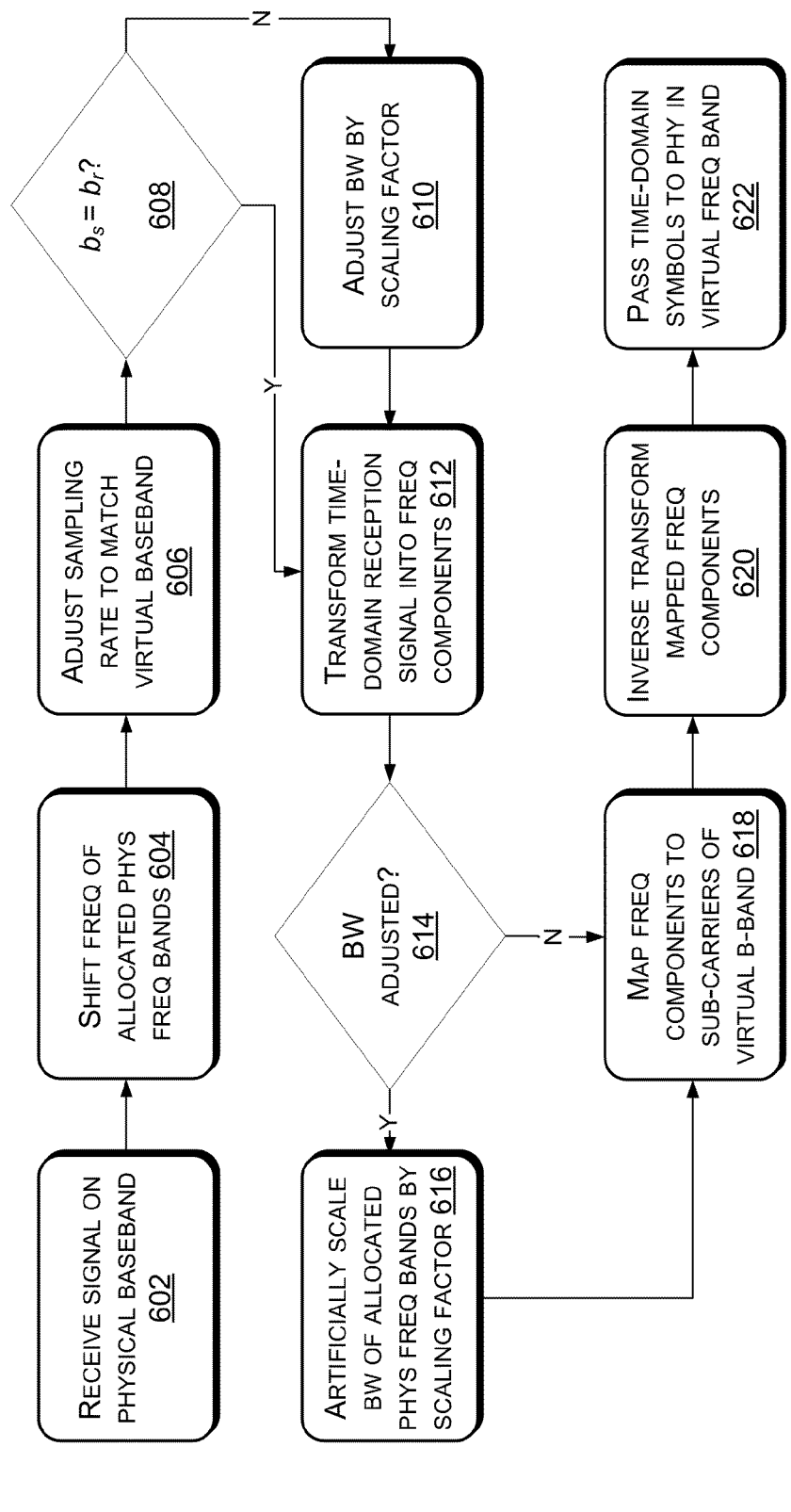
FIG. 6 is a flow diagram showing an example process of reshaping during reception.

FIG. 6 is a flow diagram showing an example process 600 of reshaping during reception. A radio front-end receives a signal on a physical baseband, block 602. The physical baseband may include one or more non-contiguous portions allocated for transmission by one or more wireless devices. The wireless devices may employ a conventional PHY layer protocol that expects to receive symbols in a fixed, contiguous virtual frequency band that differs from the physical baseband. The wireless device may also employ a spectrum virtualization layer to map the incoming signals from the physical spectrum band to the virtual frequency band.

A frequency shift module of the spectrum virtualization layer shifts the frequency of the allocated physical frequency band, block 604. This frequency shift compensates for a frequency shift that occurs during a remapping operation later in the reception path. The frequency is shifted by the frequency shift module by an amount equal to a negative of a central frequency of a span of the one or more allocated physical frequency bands.

A sampling rate adjustment module adjusts the sampling rate of the received signal to match the sampling rate of the virtual baseband, block 606. Operations here are the inverse of operations performed with respect to block 518 of FIG. 5.

Where $b_s$ (the aggregated bandwidth of the physical frequency bands) is less than $b_v$ (the virtual bandwidth), block 608, a bandwidth adjustment module scales the frequency of the signal by a factor α so as to make $b_s$ equal to $b_v$, block 610. Operations here are the inverse of operations performed with respect to block 516 of FIG. 5.

A reshaper obtains the frequency-shifted, sampling rate-adjusted, bandwidth-adjusted signal and performs a transformation on time-domain samples of the signal to produce a plurality of frequency components of the signal, block 612. The reshaper may perform an N-point FFT on the signal to produce N frequency components.

If the bandwidth of the signal was adjusted by a bandwidth adjustment module by a factor α, block 614, the reshaper will artificially scale the physical frequency bands by the same factor α, block 616. The bandwidth scaling enables the frequency components of the reception signal to be mapped to sub-carriers of the virtual frequency band.

The spectrum virtualization layer maps the frequency components to sub-carriers of the virtual frequency band, block 618. M of the N frequency components produced by the N-point FFT that correspond to allocated portions of the physical baseband are mapped to sub-carriers of the virtual frequency band. The mapping process includes a frequency shift of the one or more allocated physical frequency bands by an amount equal to $-f_{span}$, where $f_{span}$ is the central frequency of the span $B_{span}$ of the allocated physical bands.

The spectrum virtualization layer performs an inverse transform on the mapped frequency components to produce time-domain symbols in the virtual frequency band, block 620. The spectrum virtualization layer performs an M-point iFFT on the M mapped frequency components to produce the time-domain symbol. Because M is the same at both the transmitter and the receiver, the reshaper at the receiver can maintain the frame size of the transmitted PHY symbol, and therefore reproduce the symbol that was produced by the PHY layer at the transmitter.

The spectrum virtualization layer passes the recomposed time-domain symbol to the PHY layer in the virtual frequency band, block 622. Any distortion caused by the reshaping process is handled using mechanisms available in the conventional PHY protocol.

Computer-Readable Media

Depending on the configuration and type of computing device used, memory 204 of wireless device 200 in FIG. 2 may include volatile memory (such as random access memory (RAM)) and/or non-volatile memory (such as read-only memory (ROM), flash memory, etc.). Memory 204 may also include additional removable storage and/or non-removable storage including, but not limited to, flash memory, magnetic storage, optical storage, and/or tape storage that may provide non-volatile storage of computer-readable instructions, data structures, program modules, and other data for wireless device 200.

Memory 204 is an example of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, software, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A method, comprising:
   mapping, by a spectrum virtualization module of a wireless device, a plurality of frequency components that are derived from a transmission symbol produced by a wireless protocol module of the wireless device for transmission on a virtual frequency band, to sub-carriers associated with one or more allocated physical frequency bands;
   outputting, by the spectrum virtualization layer, a transmission signal that includes time-domain samples derived from the mapped plurality of frequency components; and
   adjusting, by a sampling rate adjustment module, a sampling rate of the transmission signal including adding zero-pad samples to the transmission signal.

2. The method of claim 1, further comprising:
   performing, by the spectrum virtualization module, an M-point fast Fourier transform on the transmission symbol to derive the plurality of frequency components; and
   performing, by the spectrum virtualization module, an N-point inverse fast Fourier transform on the mapped plurality of frequency components to derive the time-domain samples of the transmission signal.

3. The method of claim 2, wherein the virtual frequency band has a virtual bandwidth, wherein the one or more allocated physical frequency bands are part of a physical baseband, and wherein the method further comprises selecting N to be at least as large as M multiplied by a ratio and of a width of a span of the physical baseband to the virtual bandwidth.

4. The method of claim 2, further comprising selecting M to be at least as large as a number of virtual sub-carriers of the virtual frequency band.

5. The method of claim 1, further comprising:
   scaling, by a frequency scaling module of the wireless device, the one or more allocated physical frequency bands by a factor determined at least in part by a ratio of an aggregate bandwidth of the one or more allocated physical frequency bands to a virtual bandwidth of the virtual frequency band; and
   reducing, by a bandwidth adjustment module, one or more transmission bandwidths of the transmission signal by the factor, wherein the mapping includes mapping the plurality of frequency components to sub-carriers of scaled ones of the one or more allocated physical frequency bands.

6. The method of claim 5, wherein the reducing comprises adding zero-pad samples to the time domain samples, low-pass filtering the zero-pad samples, and decimating the transmission signal to produce a bandwidth-adjusted transmission signal.

7. The method of claim 6, further comprising:
   adjusting, by a sampling rate adjustment module, a sampling rate of the bandwidth-adjusted transmission signal including adding further zero-pad samples to the bandwidth-adjusted transmission signal;
   further low-pass filtering the bandwidth-adjusted transmission signal; and
   further decimating the bandwidth-adjusted transmission signal.

8. The method of claim 1, further comprising:
   low-pass filtering the transmission signal; and
   decimating the transmission signal.

9. The method of claim 1, further comprising shifting frequencies of the one or more allocated physical frequency bands by an amount equal to a central frequency of a span of the one or more allocated physical frequency bands upon in response to the mapping of the frequency components to the sub-carriers associated with the one or more allocated physical frequency bands.

10. A method, comprising:
    receiving, by a spectrum virtualization module of a wireless device, a receive signal from a radio front-end of the wireless device, the receive signal received by the wireless device on one or more allocated physical reception bands;
    adjusting, by the spectrum virtualization module, the receive signal to match a virtual sampling rate of a virtual frequency band;
    transforming, by the spectrum virtualization module, time domain samples of the receive signal to produce a plurality of receive frequency components;

mapping, by the spectrum virtualization module, the receive frequency components that correspond to a plurality of non-contiguous allocated physical reception bands to sub-carriers of the virtual frequency band; and inverse transforming, by the spectrum virtualization module, the mapped receive frequency components to produce a virtual receive symbol in the virtual frequency band.

11. The method of claim 10, wherein:

the transforming includes performing an N-point fast Fourier transform of the receive signal to produce N frequency components; and the inversely transforming includes collecting M frequency components of the N frequency components that correspond to the plurality of non-contiguous allocated physical reception bands, and performing an M-point inverse fast Fourier transform of the M frequency components.

12. The method of claim 11, wherein the mapping includes mapping the M frequency components to sub-carriers of the virtual frequency band.

13. The method of claim 10, further comprising shifting frequencies of the one or more allocated physical frequency bands by an amount equal to a negative of a central frequency of a span of the one or more allocated physical frequency bands.

14. A wireless device, comprising:

a processor;

a radio front-end configured to wirelessly transmit and receive on a physical baseband;

a protocol module executable by the processor and configured to generate a transmission symbol for transmission on a virtual transmission band; and a decomposition/recomposition module executable by the processor and configured to perform an M-point fast Fourier transform on the transmission symbol to produce M transmission frequency domain components, to map the M transmission frequency domain components to transmission sub-carriers associated with one or more portions of the physical baseband that are allocated for transmission, and to perform an N-point inverse fast Fourier transform on the mapped M transmission frequency domain components to produce time domain samples of a transmission signal in the physical baseband; and a bandwidth adjustment module configured to reduce a transmission bandwidth of the transmission signal by addition of zero-pad samples to the time domain samples of the transmission signal.

15. The wireless device of claim 14, wherein the one or more portions of the physical baseband that are allocated for transmission include an aggregate transmission bandwidth, and wherein the decomposition/recomposition module is configured to select N to be at least as large as M multiplied by a ratio that is of a width of a span of the physical baseband to a virtual bandwidth of the virtual transmission.

16. The wireless device of claim 14, further comprising:

a bandwidth scaling module configured to scale the one or more portions of the physical frequency band allocated for transmission by a factor that is determined at least in part by a ratio of the aggregated physical bandwidth of the one or more portions of the physical baseband allocated for transmission to a virtual bandwidth of the virtual transmission band, wherein the decomposition/recomposition module is further configured to map the M transmission frequency domain components to the transmission sub-carriers based on scaled ones of the one or more portions of the physical frequency band, and wherein the reducing the transmission bandwidth of the transmission signal comprises reducing the; and transmission bandwidth of the transmission signal by the factor.

17. The wireless device of claim 16, wherein the bandwidth adjustment module is further configured to:

low-pass filter of the zero-padded samples; and decimate the transmission signal.

18. The wireless device of claim 14, further comprising a sampling rate adjustment module configured to add zero-pad samples to the transmission signal, to low-pass filter the transmission signal, and to decimate the transmission signal by a factor that is based on a ratio of a least common multiple of a transmission bandwidth of the transmission signal to a sampling rate of the radio front-end.

19. The wireless device of claim 14, wherein the decomposition/recomposition module is further configured to perform N-point fast Fourier transform on a receive signal to produce N receive frequency components, to reverse map M of the N receive frequency components corresponding to allocated portions of one or more portions of the physical frequency band allocated for reception, and to perform M-point inverse fast Fourier transform on the M receive frequency components to produce time domain samples of a received signal in a virtual reception band.

* * * * *